US007813864B2

(12) United States Patent
Kawai et al.

(10) Patent No.: US 7,813,864 B2
(45) Date of Patent: Oct. 12, 2010

(54) CONTROL APPARATUS FOR INTERNAL COMBUSTION ENGINE

(75) Inventors: Takashi Kawai, Susono (JP); Koji Morita, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 286 days.

(21) Appl. No.: 12/085,168

(22) PCT Filed: Nov. 30, 2006

(86) PCT No.: PCT/JP2006/324414

§ 371 (c)(1),
(2), (4) Date: May 16, 2008

(87) PCT Pub. No.: WO2007/066706

PCT Pub. Date: Jun. 14, 2007

(65) Prior Publication Data

US 2009/0292441 A1 Nov. 26, 2009

(30) Foreign Application Priority Data

Dec. 5, 2005 (JP) ............................. 2005-351302
Apr. 28, 2006 (JP) ............................. 2006-125824

(51) Int. Cl.
*F02D 41/00* (2006.01)
*F01L 1/34* (2006.01)
(52) U.S. Cl. ................ 701/103; 123/179.15; 123/90.15
(58) Field of Classification Search ............. 123/90.15, 123/179.15; 701/103
See application file for complete search history.

(56) References Cited

U.S. PATENT DOCUMENTS

| 6,357,409 B1 | 3/2002 | Haghgooie et al. |
| 7,159,556 B2 * | 1/2007 | Yoshihara .............. 123/179.18 |
| 2003/0136361 A1 | 7/2003 | Ogiso |
| 2003/0172888 A1 * | 9/2003 | Miura ..................... 123/90.15 |
| 2004/0000138 A1 | 1/2004 | Tamura |

FOREIGN PATENT DOCUMENTS

| DE | 197 36 137 C1 | 10/1998 |
| DE | 101 24 738 A1 | 12/2001 |
| EP | 0 717 172 A1 | 6/1996 |
| EP | 1 136 659 A2 | 9/2001 |
| JP | A 5-86908 | 4/1993 |
| JP | A 2001-59428 | 3/2001 |
| JP | A 2002-206436 | 7/2002 |
| JP | A 2004-176680 | 6/2004 |
| JP | A 2005-147015 | 6/2005 |

* cited by examiner

*Primary Examiner*—Stephen K Cronin
*Assistant Examiner*—Arnold Castro
(74) *Attorney, Agent, or Firm*—Oliff & Berridge, PLC

(57) ABSTRACT

A control apparatus (100) controls the operating condition of an engine (200) comprising a valve operating apparatus (10) capable of changing valve operating characteristics of an intake valve (203) and an exhaust valve (204). This is provided with: an intake valve control device (110) for controlling the valve operating apparatus (10) to set the intake valve (203) continuously open, during a cranking operation of the engine (10); and an exhaust control device (120) for controlling the valve operating apparatus (10) to set the exhaust valve (204) continuously close, during the cranking operation.

15 Claims, 20 Drawing Sheets

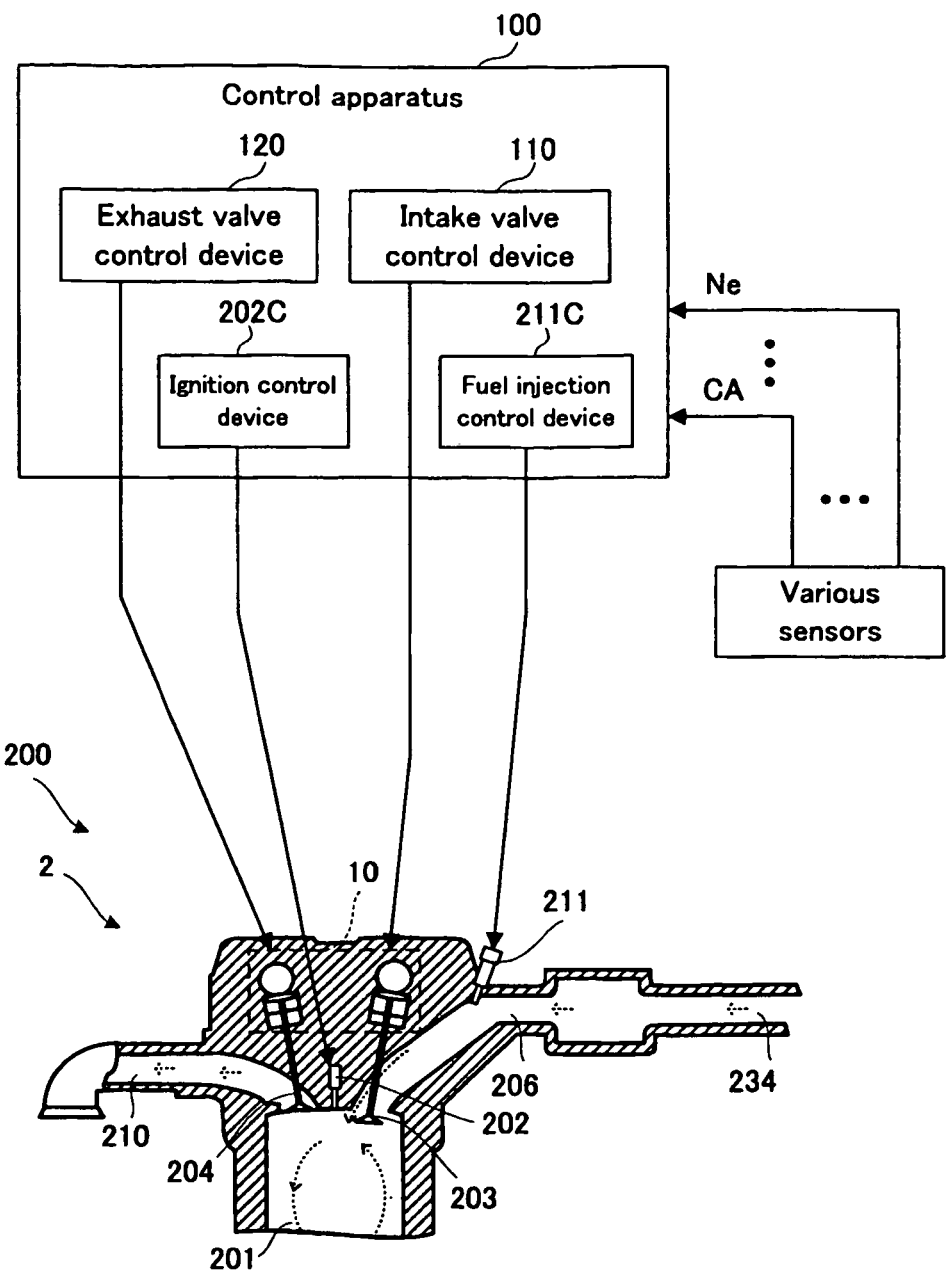
[FIG. 1]

[FIG. 2]
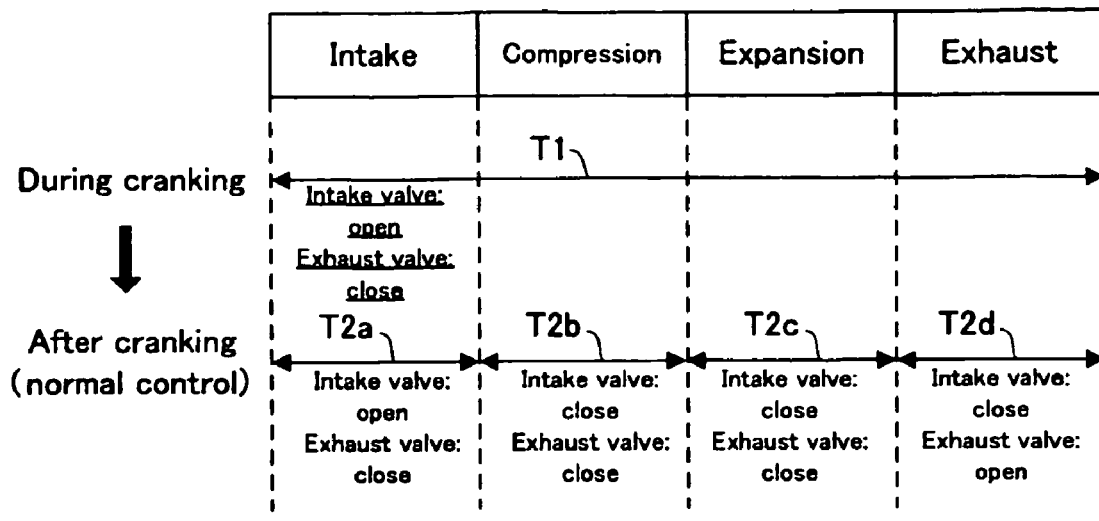

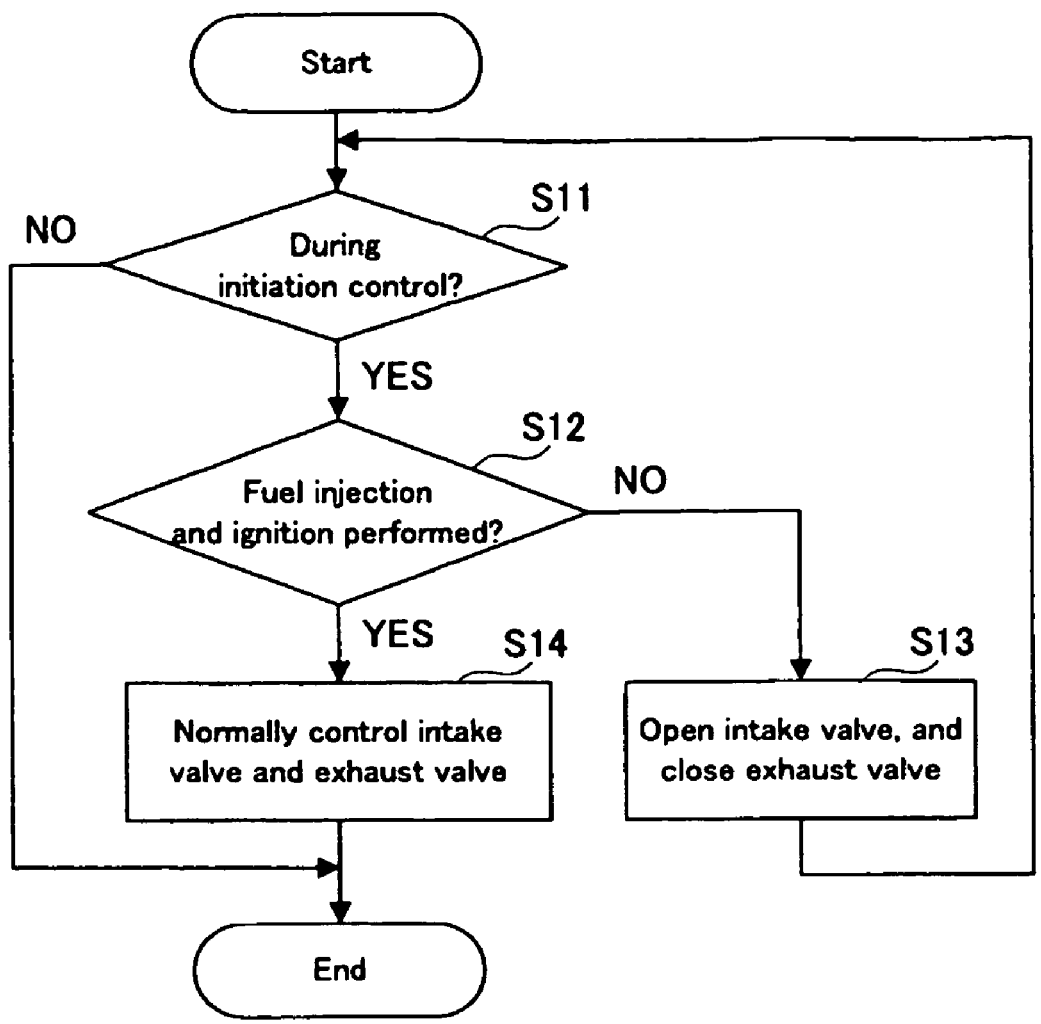

[FIG. 4]
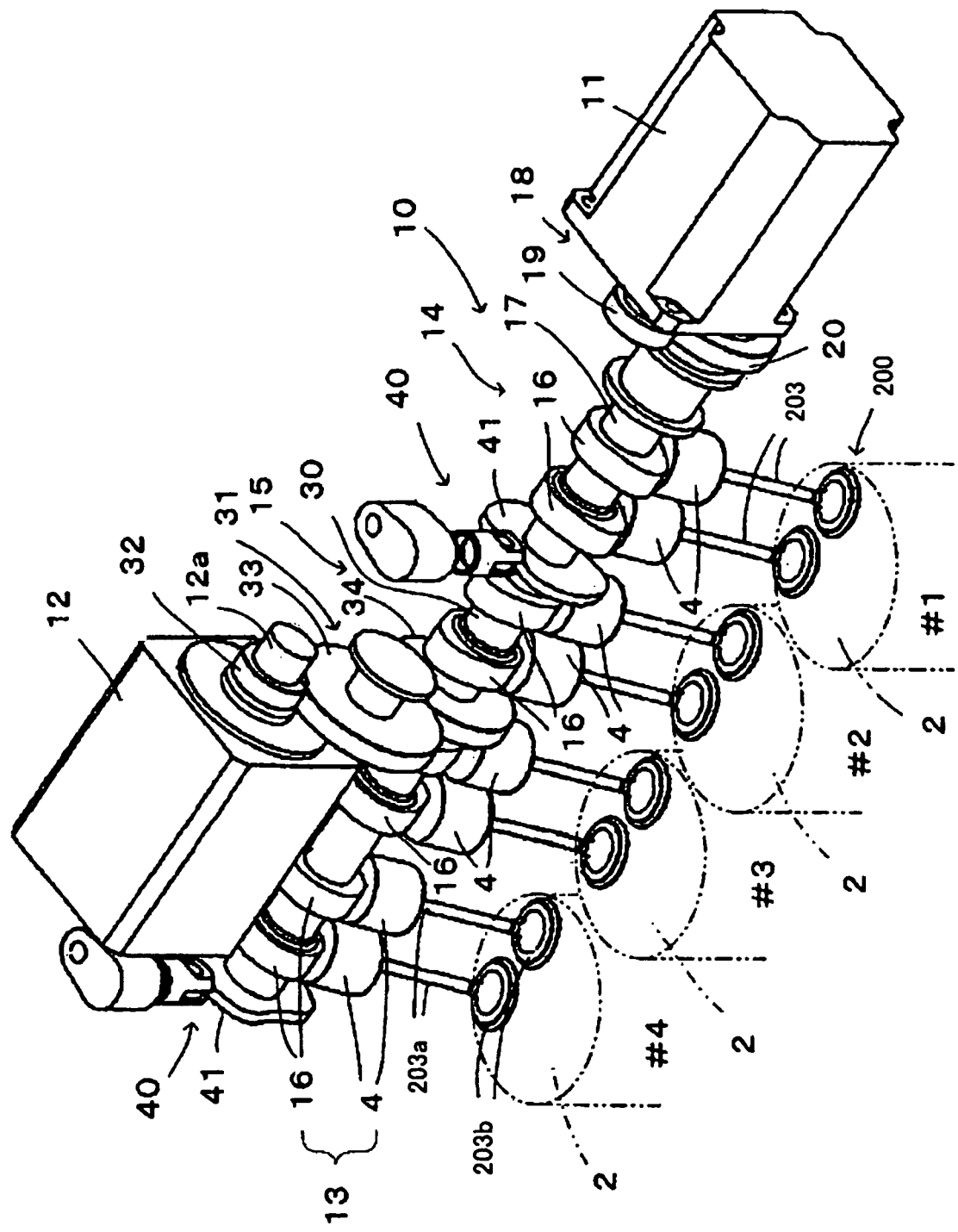

[FIG. 5]
(a)
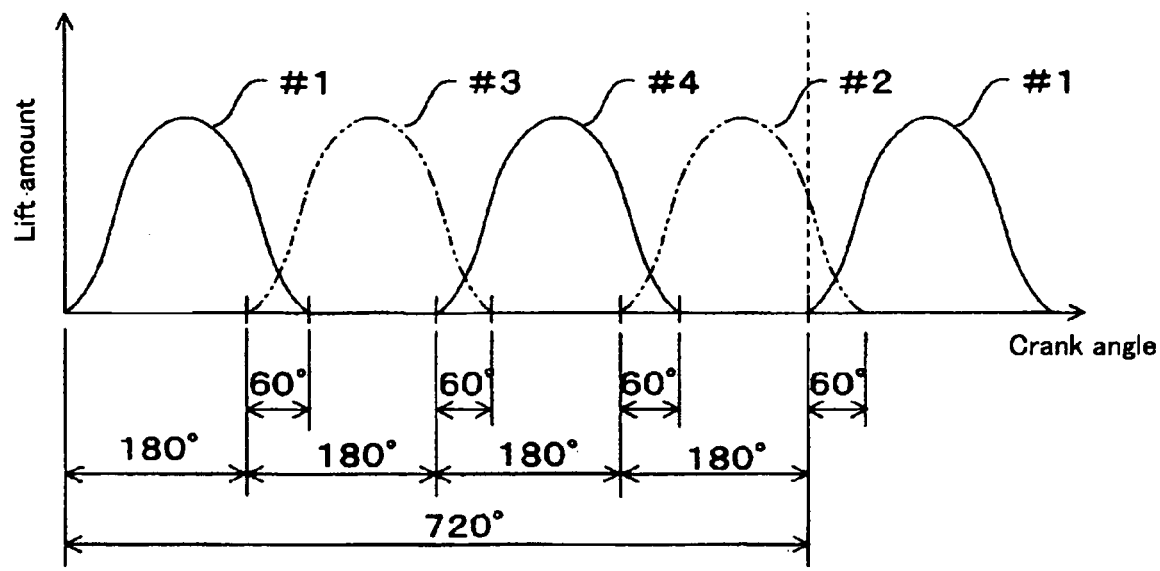
(b)
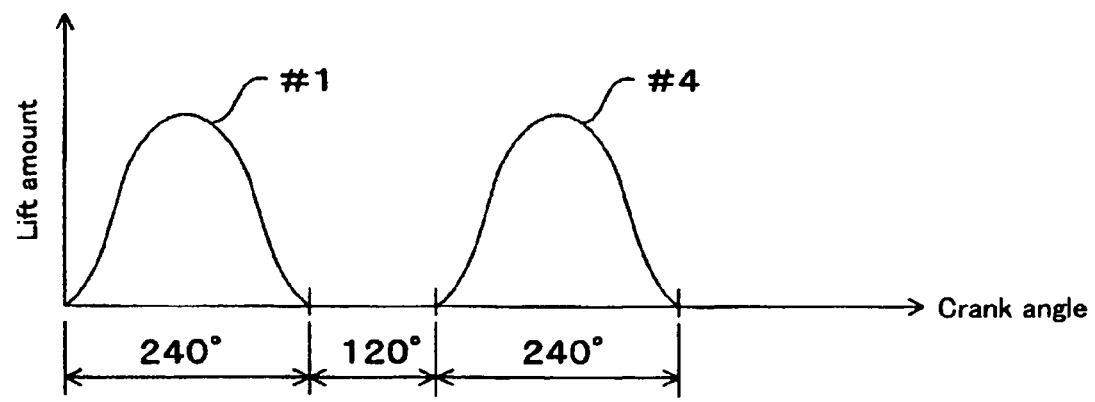
(c)
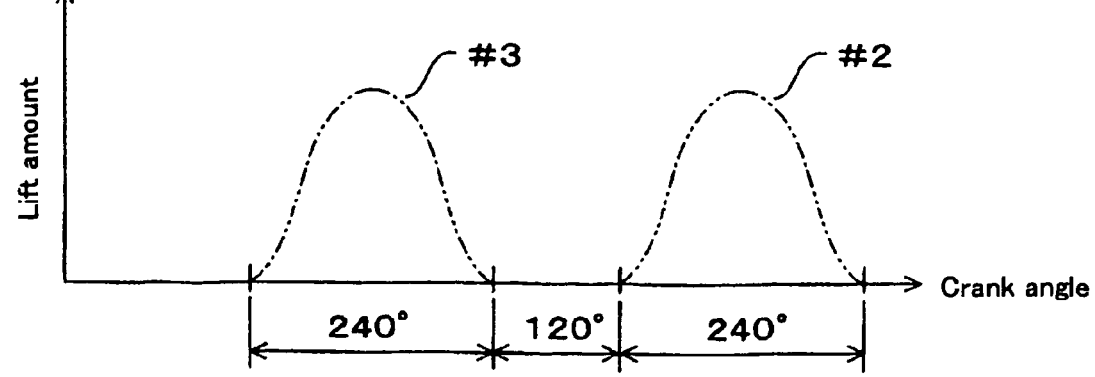

[FIG. 6]
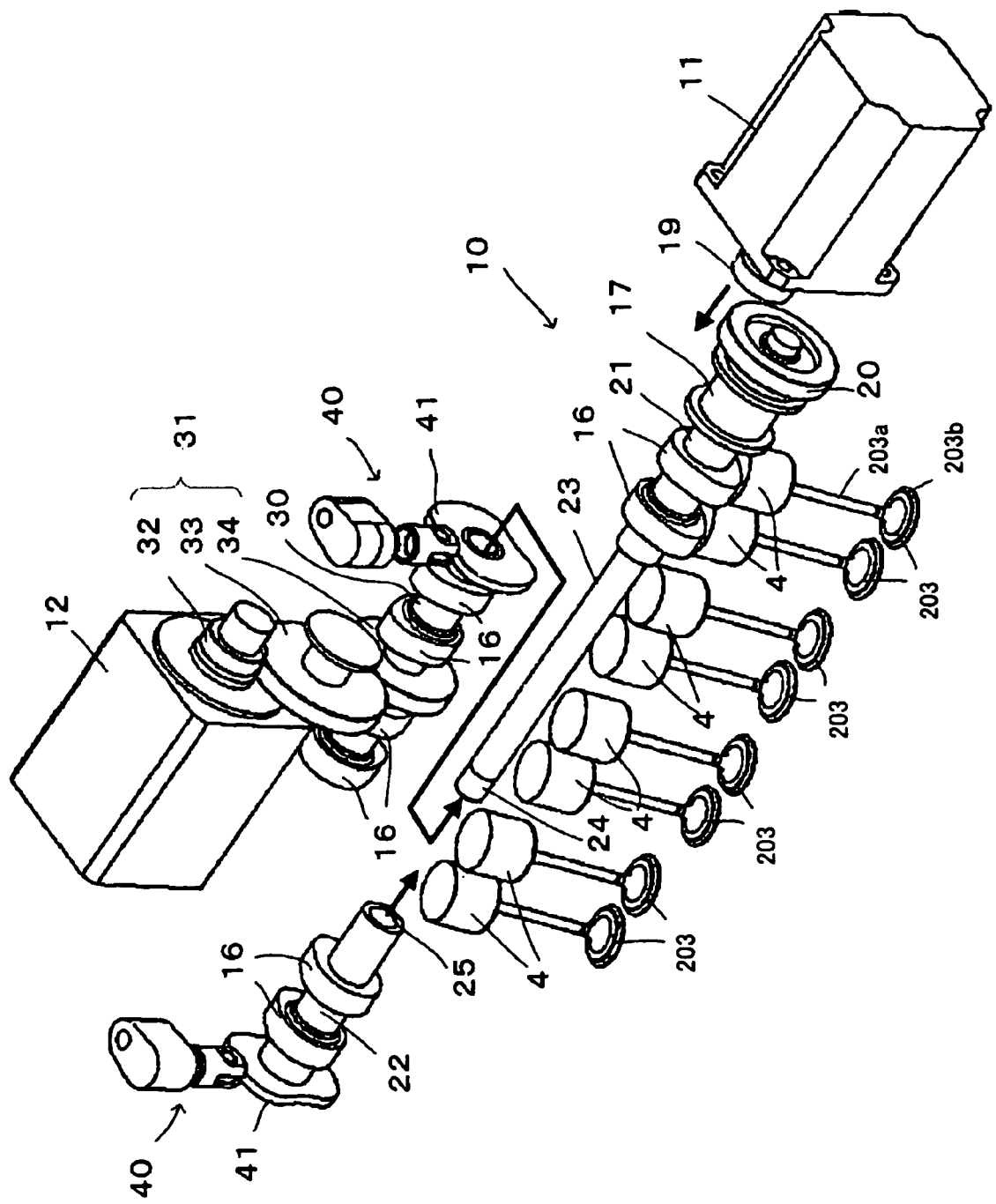

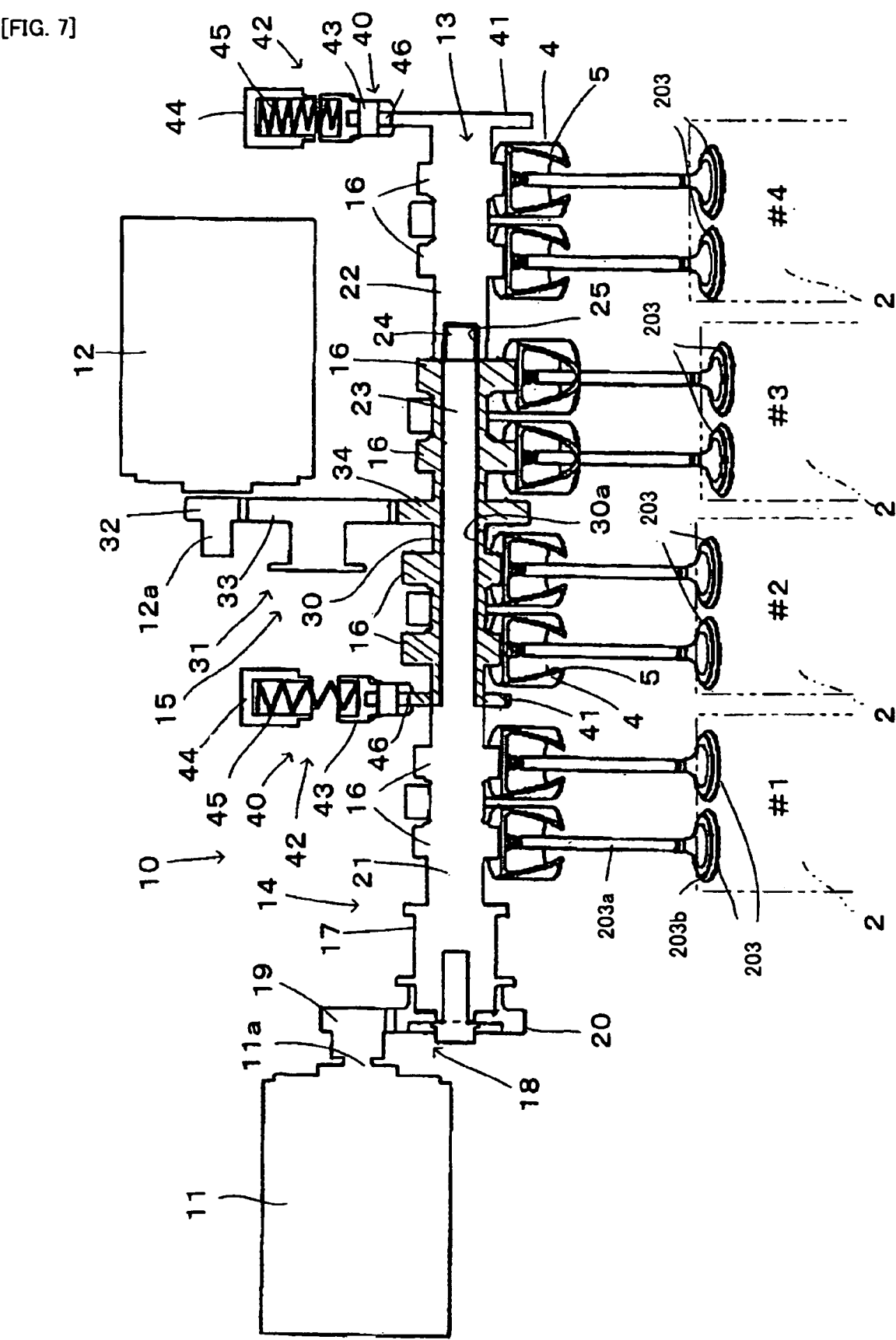
[FIG. 7]

[FIG. 8]
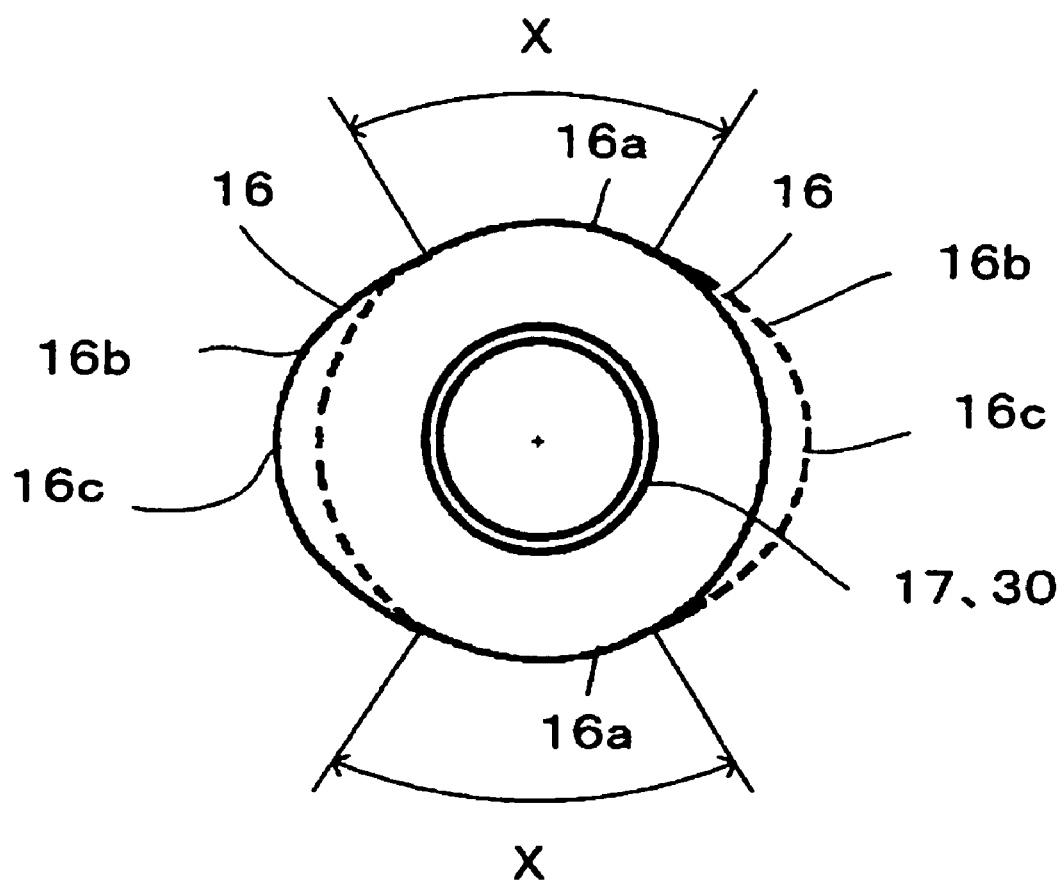

[FIG. 9]
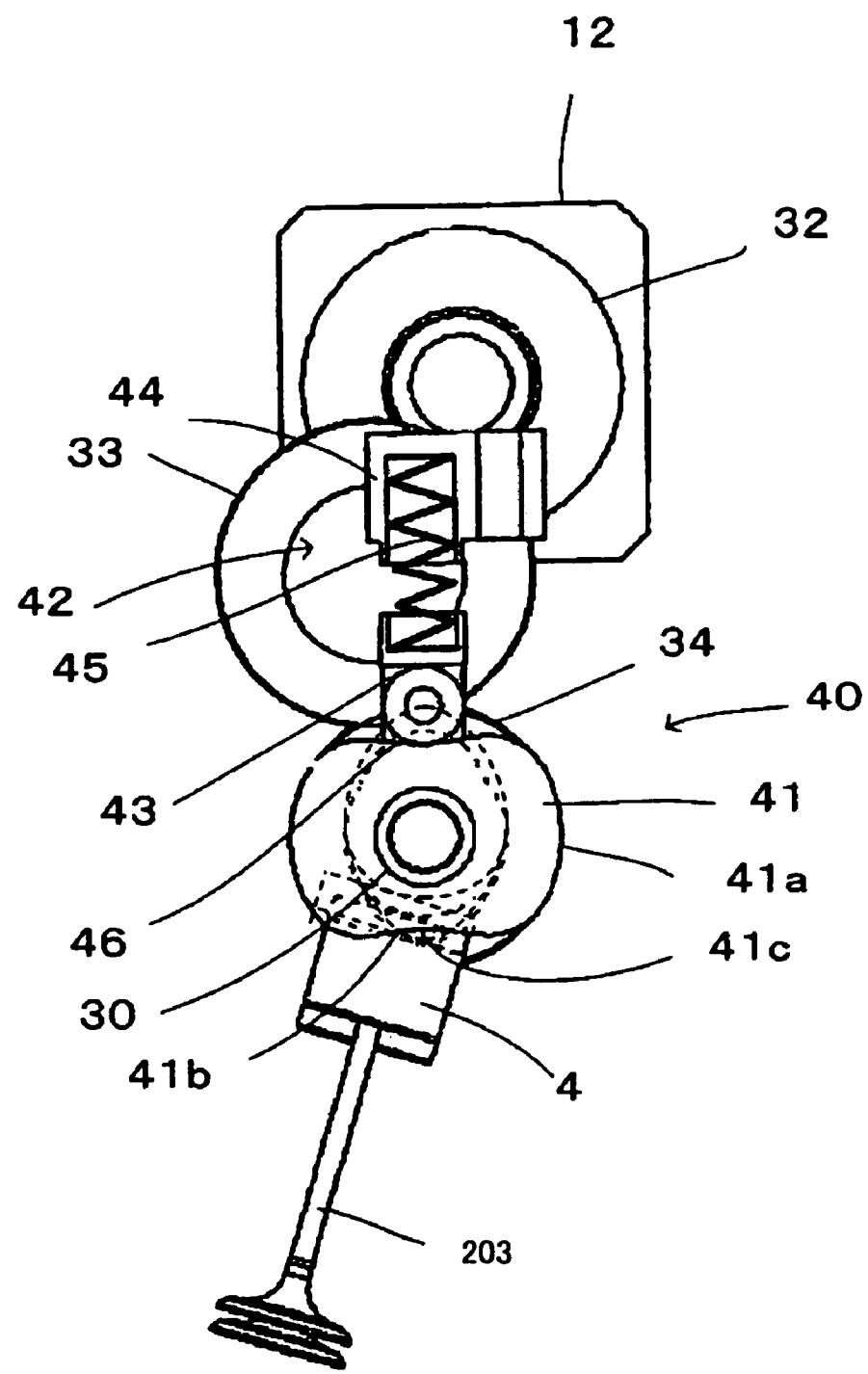

[FIG. 10]
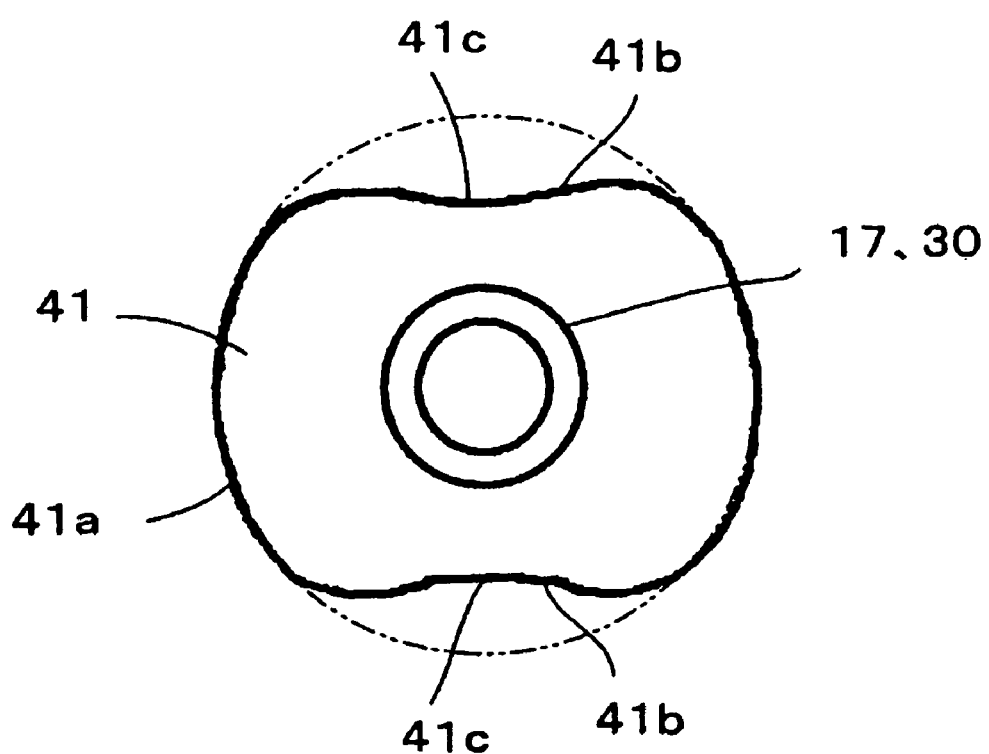

[FIG. 11]
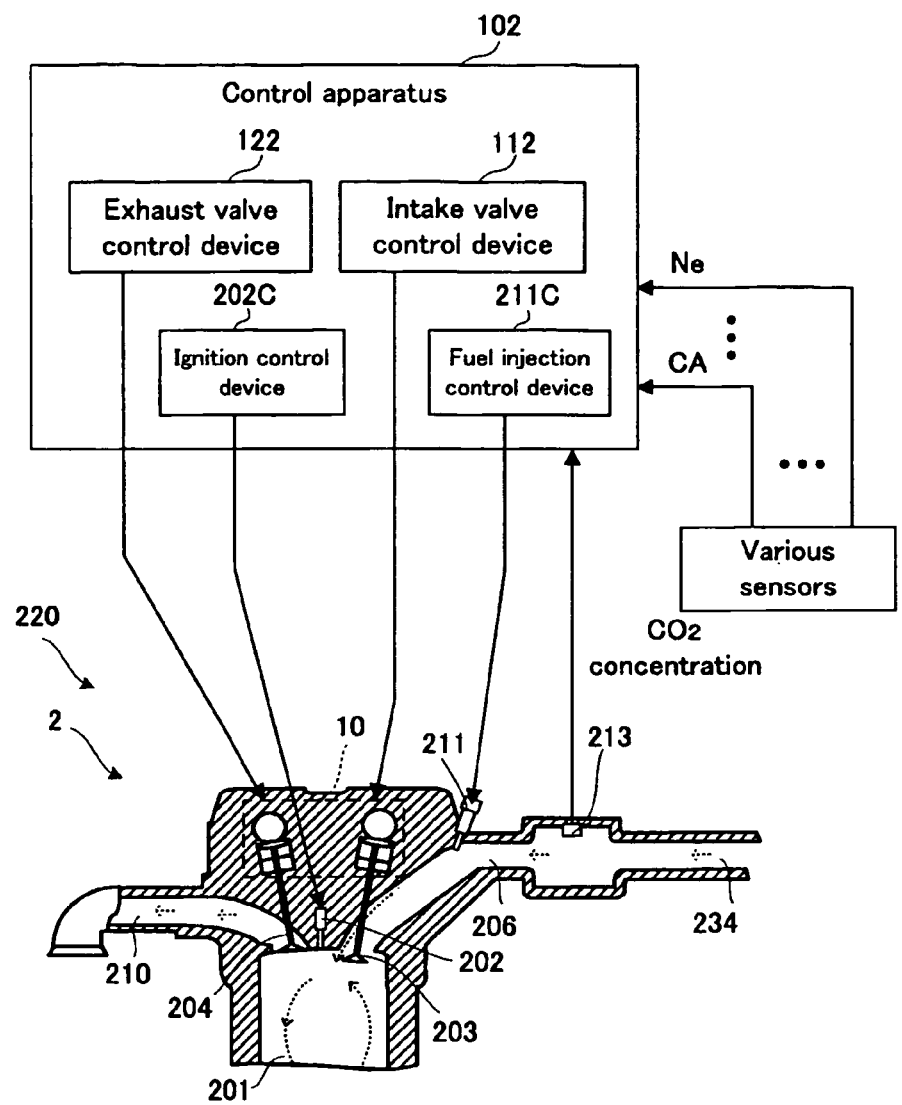

[FIG. 12]
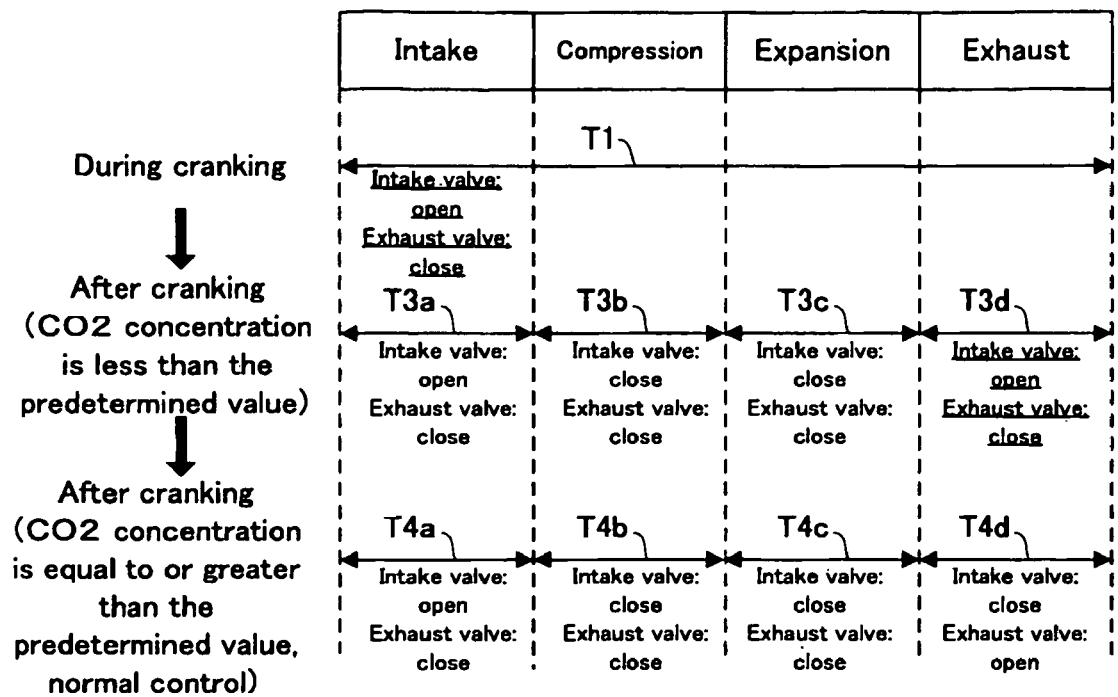

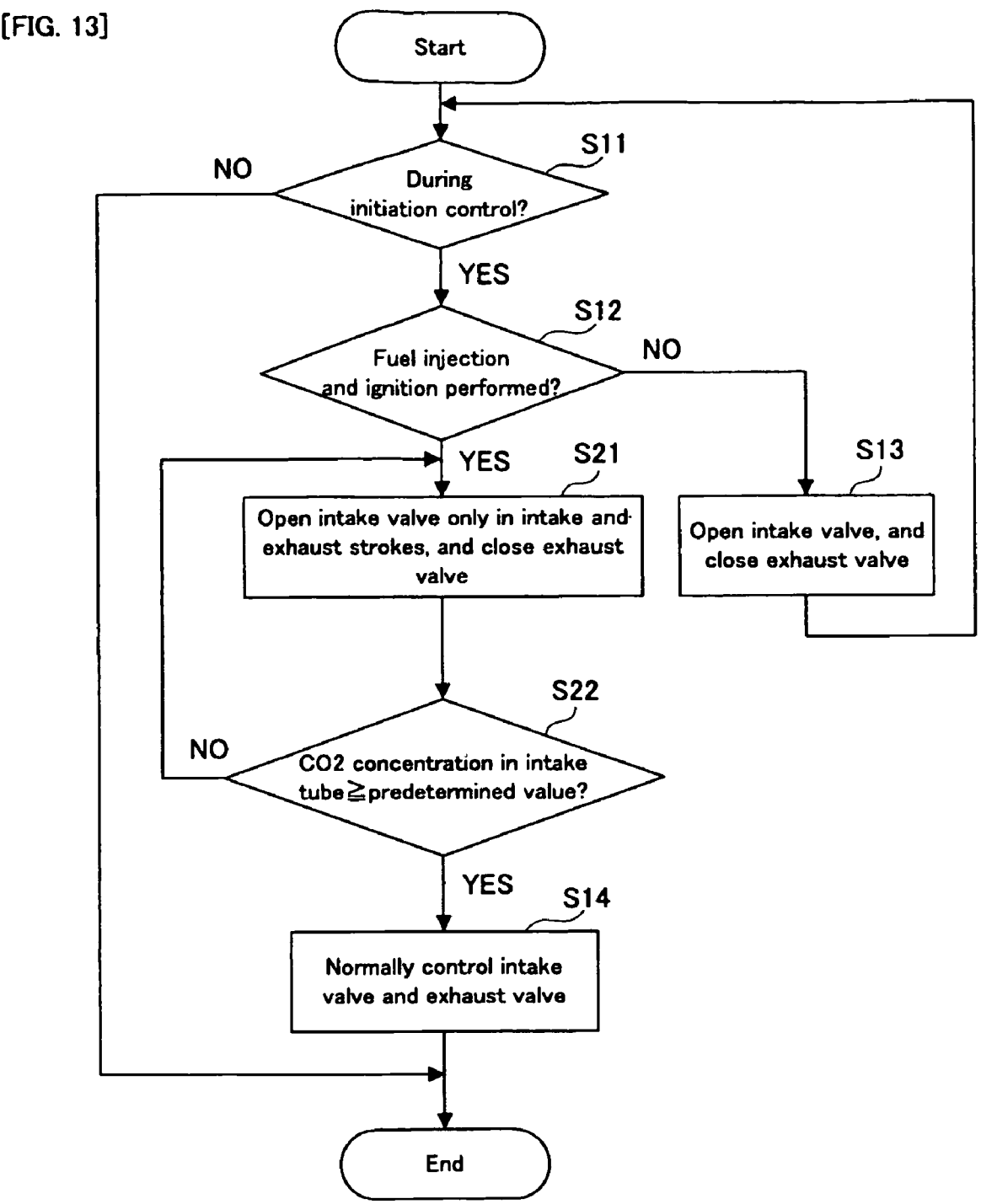
[FIG. 13]

[FIG. 14]
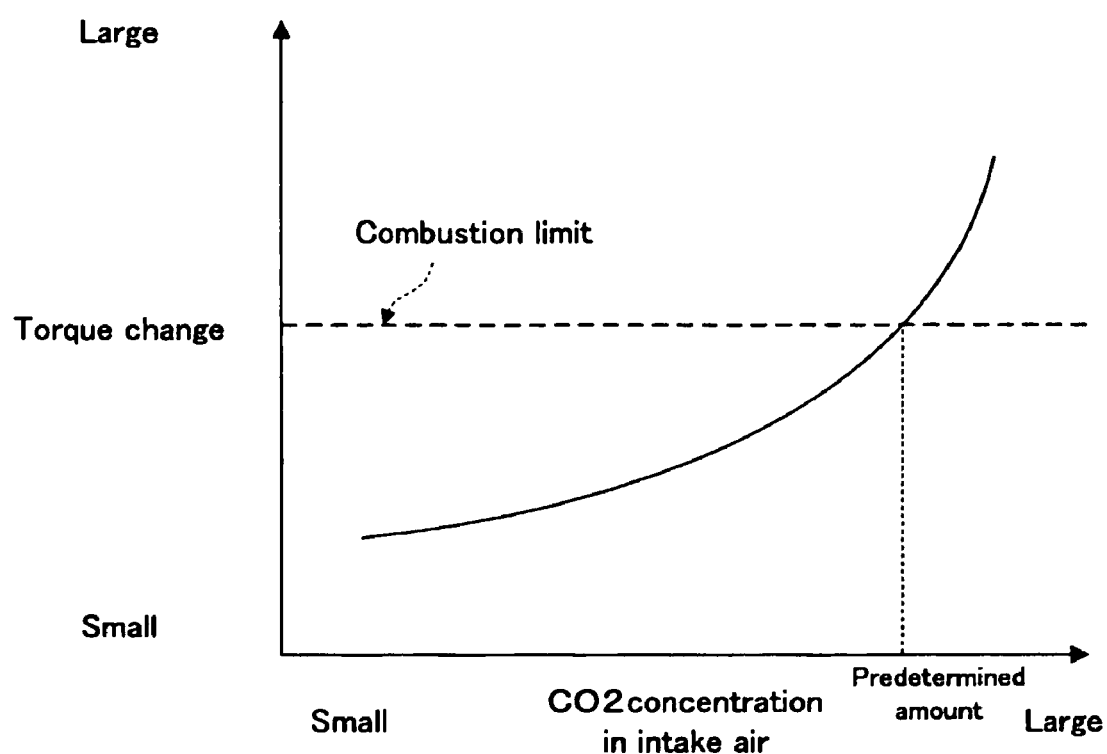

[FIG. 15]
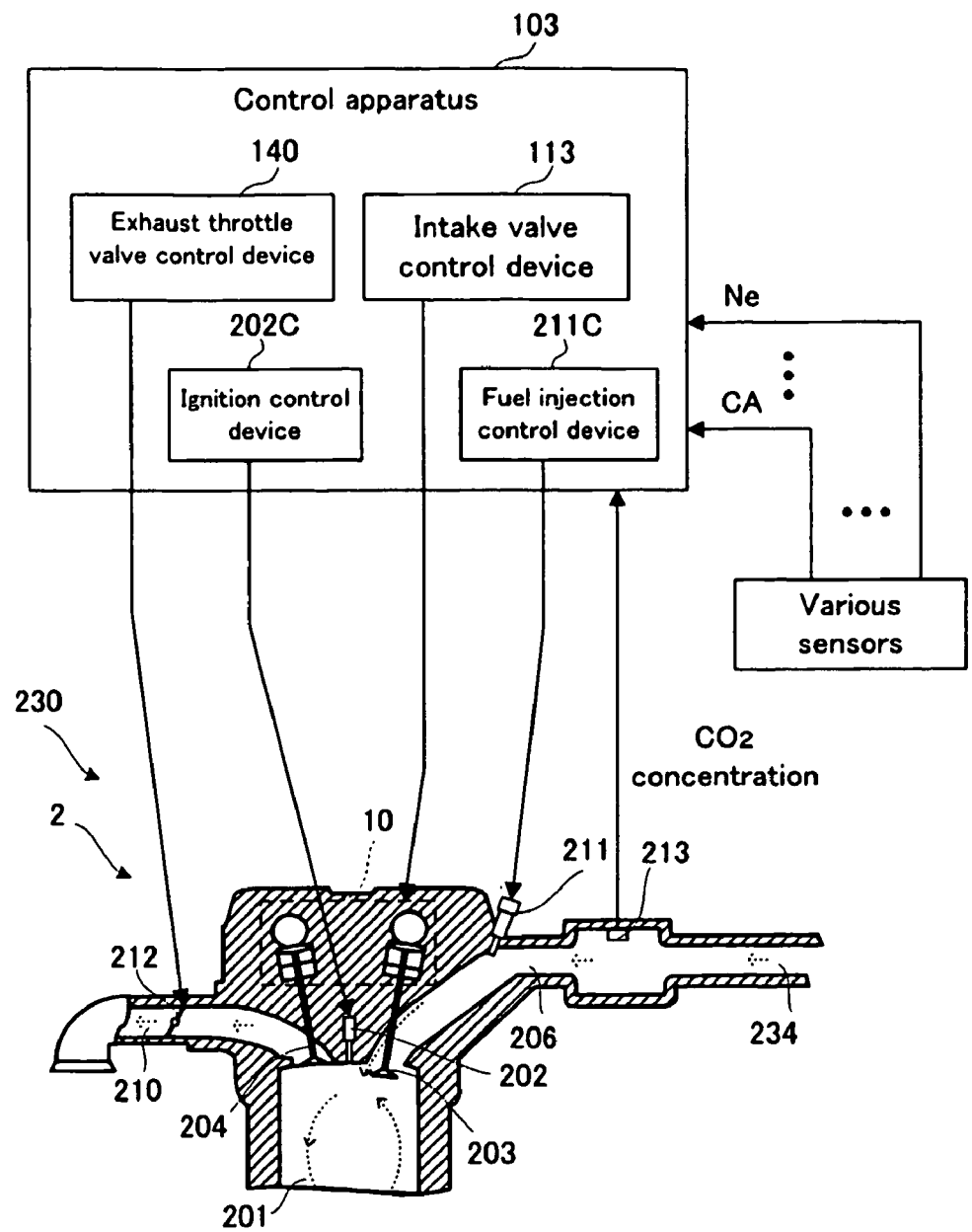

[FIG. 16]
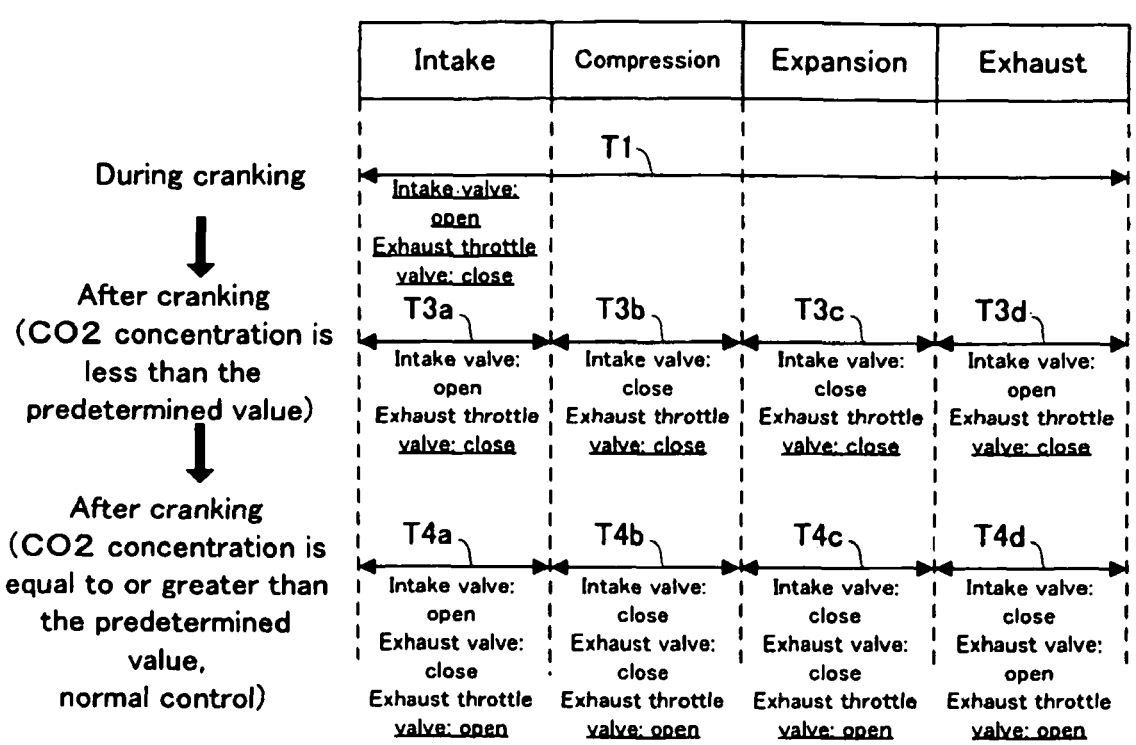

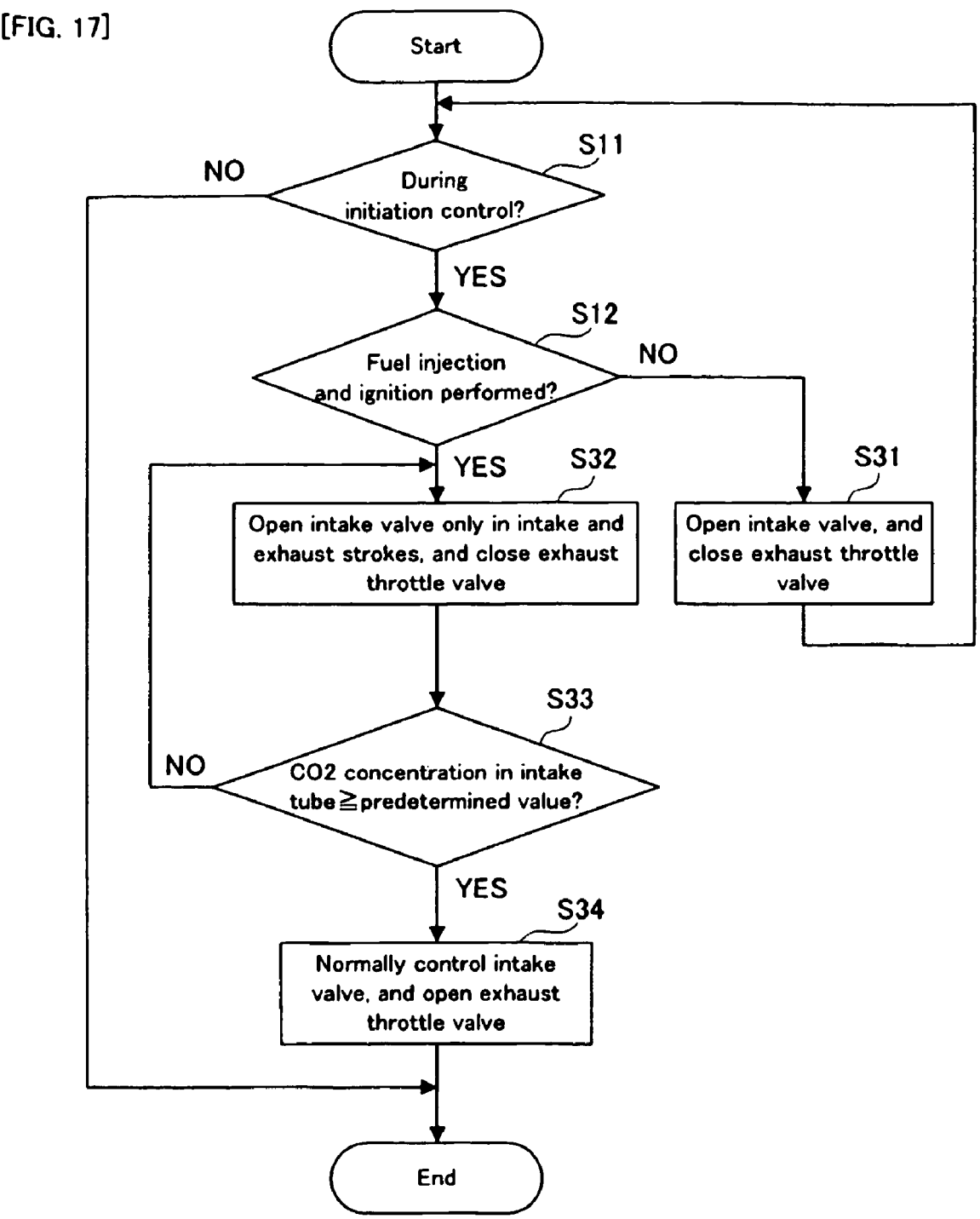
[FIG. 17]

[FIG. 18]
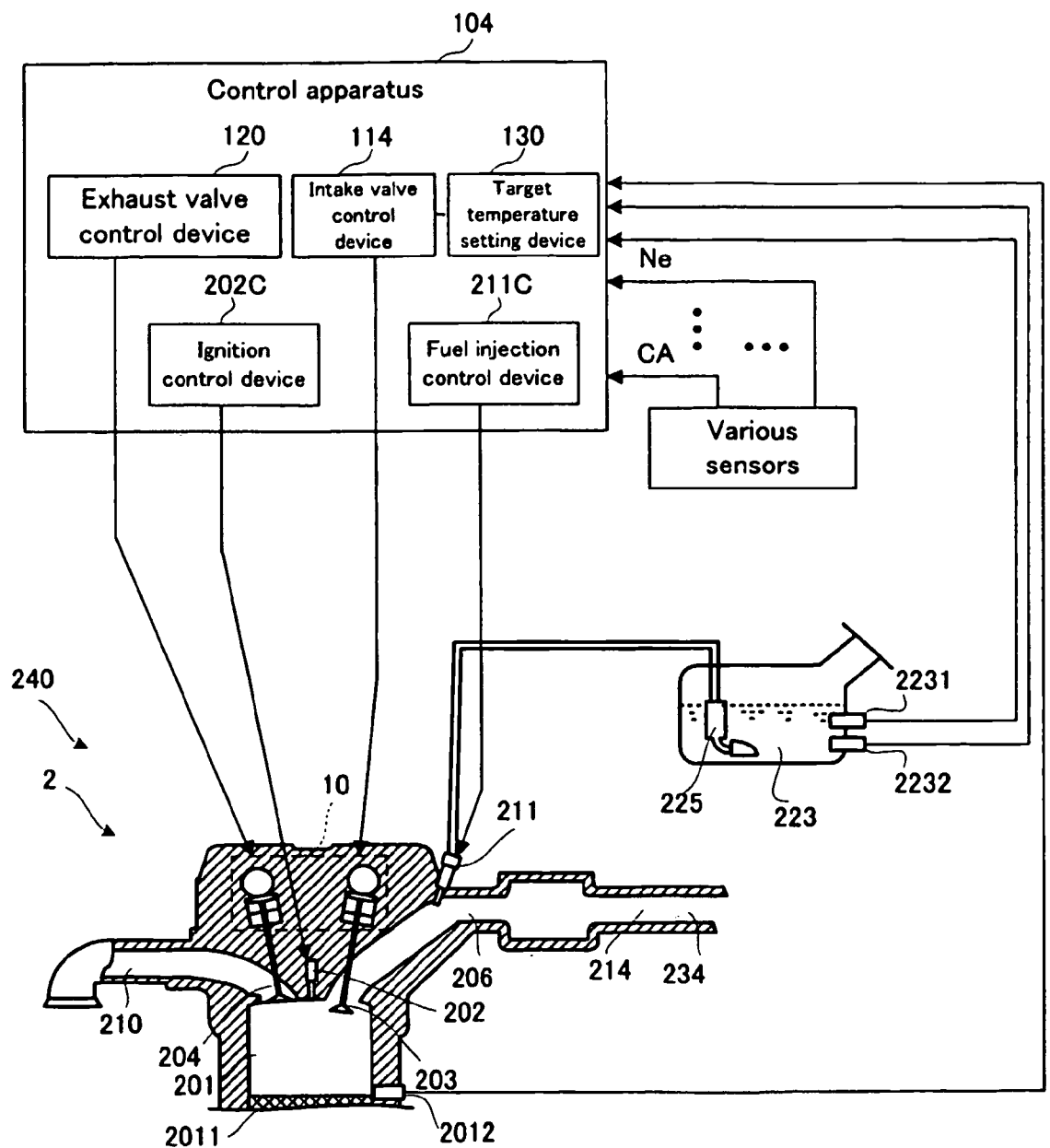

[FIG. 19]
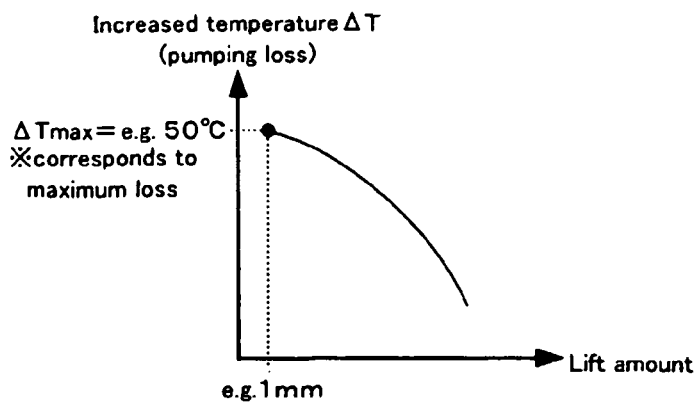
[FIG. 20]
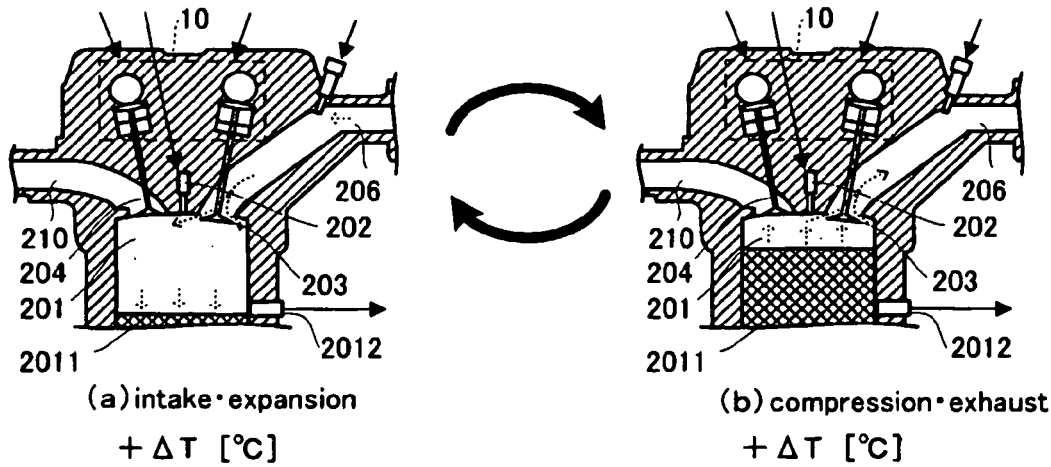
(a) intake・expansion
+ΔT [°C]
(b) compression・exhaust
+ΔT [°C]
[FIG. 21]
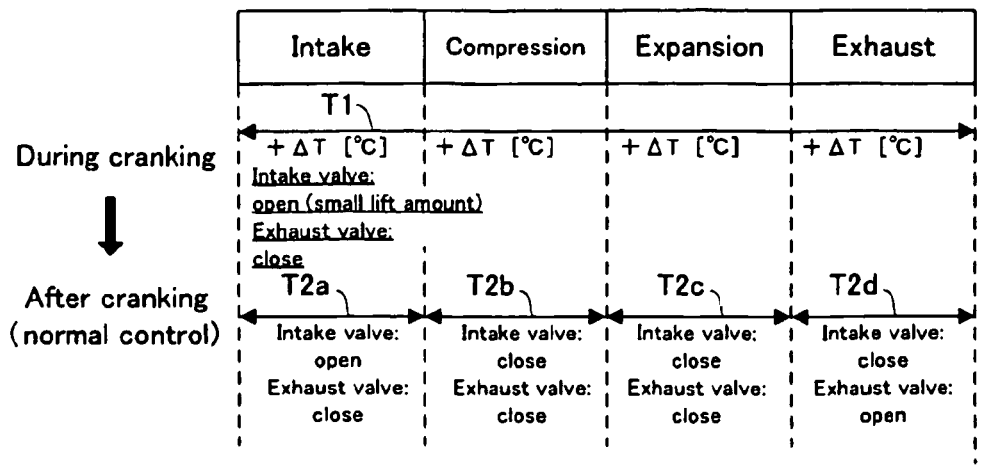

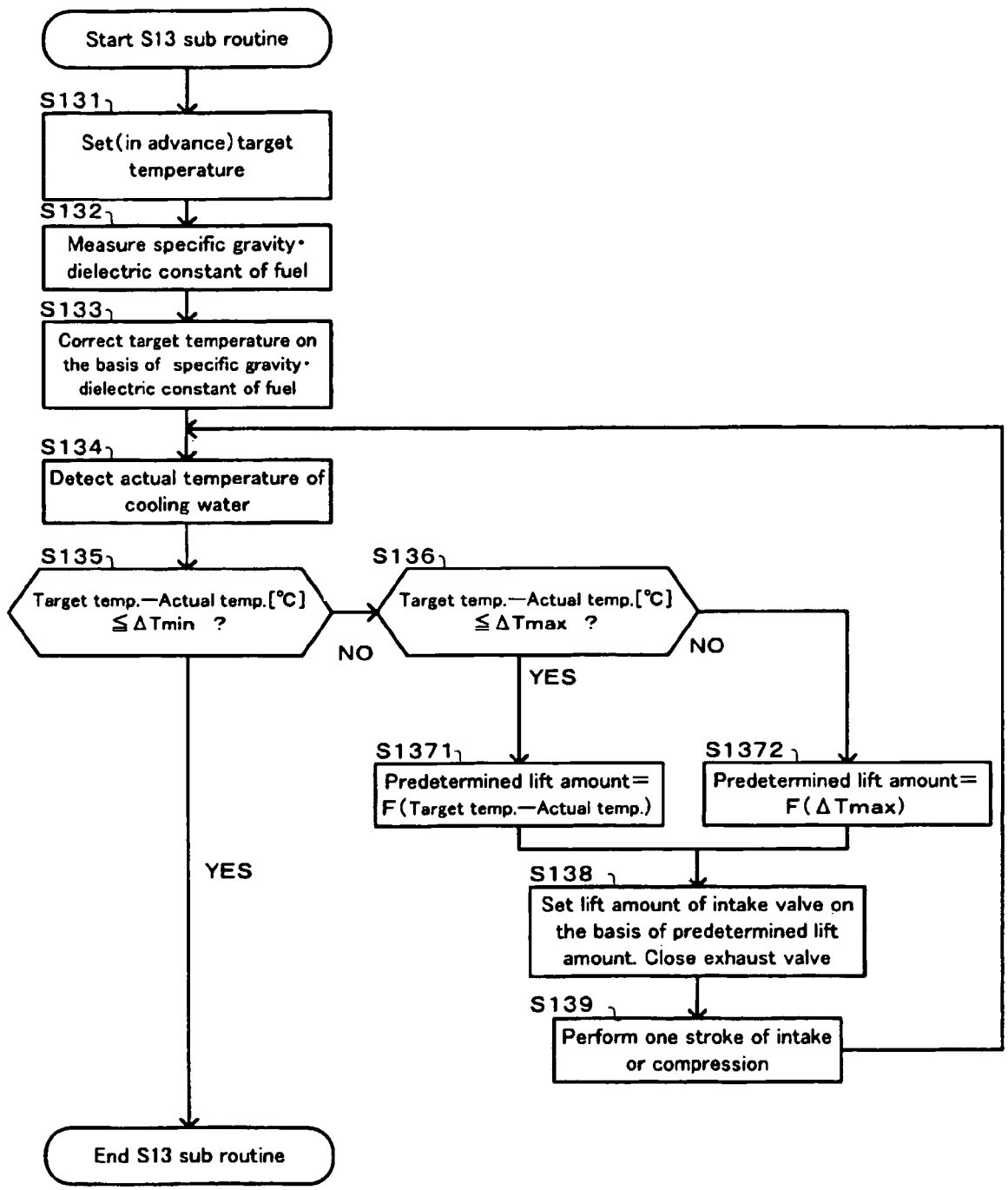
[FIG. 22]

CONTROL APPARATUS FOR INTERNAL COMBUSTION ENGINE

TECHNICAL FIELD

The present invention relates to a control apparatus for an internal combustion engine, such as the engine of an automobile, for example.

BACKGROUND ART

In this type of internal combustion engine, there are suggested various technologies of reducing unburned hydrocarbon (hereinafter referred to as "HC", as occasion demands) or the like to thereby prevent the deterioration of exhaust emissions. For example, in a patent document 1, there is suggested a technology of delaying the valve open timing of an exhaust valve so that a combustion gas in a cylinder stays longer than usual, at the cold start of the engine. In a patent document 2, there is suggested a technology of setting the exhaust valve in an almost fully close status, at the start and the warm-up operation of the engine. In a patent document 3, there is suggested a technology of setting the valve overlap, in which both the intake valve and the exhaust valve are close, to be substantially equal at the start of the engine and the subsequent idling, and of setting the overlap center to locate on the more advanced angle side as the temperature of the engine drop. In a patent document 4, there is suggested a technology of advancing the angle of the exhaust valve after HC is reduced by increasing the valve overlap and by bringing an exhaust gas back into the cylinder and burning it, at the start of the engine. In a patent document 5, there is suggested a technology of increasing a burned gas ratio in filled gases and of burning HC again by opening the exhaust valve on the basis of the operating condition of the engine.

Patent document 1: Japanese Patent Application Laid Open NO. 2005-147015

Patent document 2: Japanese Patent Application Laid Open NO. 2001-59428

Patent document 3: Japanese Patent Application Laid Open NO. 2004-176680

Patent document 4: Japanese Patent Application Laid Open NO. 2002-206436

Patent document 5: Japanese Patent Application Laid Open NO. Hei 5-86908

DISCLOSURE OF INVENTION

Subject to be Solved by the Invention

In the above-mentioned technologies, however, there is such a technical problem that it is difficult to prevent the deterioration of exhaust emissions immediately after the start, such as a case where a residual burned gas remains in an engine stop condition and a case where there is a leak in an injector. Moreover, there is also such a technical problem that in a case where the burned gas ratio is increased in the combustion in order to improve the exhaust emissions, if the burned gas ratio becomes too large, that may cause the deterioration of the combustion and torque change.

In order to solve the above-mentioned problems, it is therefore an object of the present invention to provide a control apparatus for an internal combustion engine, capable of reducing the amount of emissions of unburned HC.

Means for Solving the Subject

The above object of the present invention can be achieved by a first control apparatus for an internal combustion engine, for controlling an operating condition of an internal combustion engine provided with a variable valve operating mechanism capable of changing valve operating characteristics of an intake valve and an exhaust valve, the control apparatus provided with: an intake valve controlling device for controlling the variable valve operating mechanism to set the intake valve continuously open, during a cranking operation of the internal combustion engine; and an exhaust controlling device for controlling at least one of the variable valve operating mechanism and an exhaust throttle valve, to set at least one of the exhaust valve and the exhaust throttle valve continuously close, during the cranking operation, the exhaust throttle valve being disposed in an exhaust path on a downstream side of the exhaust valve.

According to the first control apparatus for an internal combustion engine of the present invention, at the time of the operation thereof, the intake valve controlling device controls the variable valve operating mechanism to set the intake valve continuously open, and the exhaust controlling device controls at least one of the variable valve operating mechanism and the exhaust throttle valve, to set at least one of the exhaust valve and the exhaust throttle valve continuously close, during the cranking operation of the internal combustion engine. Here, the expression that the "intake valve" is set "continuously open" in the present invention, is different from the normal operating condition of the internal combustion engine, and it means that the valve open status of the intake valve is maintained over a period corresponding to a plurality of continuous strokes, including the strokes other than an intake stroke, out of the intake stroke, a compression stroke, an expansion stroke, and an exhaust stroke. Moreover, the expression that the "exhaust valve" is set "continuously close" in the present invention, is different from the normal operating condition of the internal combustion engine, and it means that the valve close status of the exhaust valve or the exhaust throttle valve is maintained over a period corresponding to a plurality of continuous strokes, including the strokes other than the exhaust stroke, out of the intake stroke, the compression stroke, the expansion stroke, and the exhaust stroke. Thus, by the cranking operation, the residual gas including unburned hydrocarbon (hereinafter referred to as "unburned HC", as occasion demands) before the cranking operation, which exists in each cylinder of the internal combustion engine, is flown not to the downstream side of the exhaust path through the exhaust valve or the exhaust throttle valve, but to an intake path through the intake valve. The residual gas flown to the intake path in this manner is sucked into the cylinder again with the fuel and the air newly supplied, in the intake stroke of the internal combustion engine in the normal operating condition after the cranking operation. Thus, the unburned HC included in the residual gas before the cranking operation is burnt in the cylinder of the internal combustion engine. Therefore, it is possible to inhibit or prevent the unburned HC included in the residual gas before the cranking operation from being emitted to the exterior of the internal combustion engine, by the cranking operation.

Incidentally, in the present invention, it is only necessary to set at least one of the exhaust valve and the exhaust throttle valve close, as described above. If the exhaust valve is controlled by the exhaust controlling device to be continuously close, the internal combustion engine is not necessarily provided with the exhaust throttle valve. Namely, not only the internal combustion engine provided with both the exhaust valve and the exhaust throttle valve, but also the internal combustion engine without the exhaust throttle valve is also the control target of the present invention.

The above object of the present invention can be achieved by a second control apparatus for an internal combustion engine, for controlling an operating condition of an internal combustion engine provided with a variable valve operating mechanism capable of changing valve operating characteristics of an intake valve and an exhaust valve, the control apparatus provided with: an intake valve controlling device for controlling the variable valve operating mechanism to set the intake valve open, during a cranking operation of the internal combustion engine, and to set the intake valve open in an exhaust stroke, in a first period from after the cranking operation to a time that burned gas concentration of the internal combustion engine is equal to or greater than a predetermined value; and an exhaust controlling device for controlling at least one of the variable valve operating mechanism and an exhaust throttle valve, to set at least one of the exhaust valve and the exhaust throttle valve close, during the cranking operation and in the first period, the exhaust throttle valve being disposed in an exhaust path on a downstream side of the exhaust valve.

According to the second control apparatus for an internal combustion engine of the present invention, at the time of the operation thereof, as in the above-mentioned first control apparatus for an internal combustion engine, the intake valve controlling device controls the variable valve operating mechanism to set the intake valve continuously open, and the exhaust controlling device controls at least one of the variable valve operating mechanism and the exhaust throttle valve, to set at least one of the exhaust valve and the exhaust throttle valve close, during the cranking operation of the internal combustion engine. Thus, it is possible to inhibit or prevent the unburned HC included in the residual gas before the cranking operation from being emitted to the exterior of the internal combustion engine, by the cranking operation.

Particularly in the present invention, the intake valve controlling device controls the variable valve operating mechanism to set the intake valve open, and the exhaust controlling device controls at least one of the variable valve operating mechanism and the exhaust throttle valve, to set at least one of the exhaust valve and the exhaust throttle valve close, in the first period from after the cranking operation to the time that the burned gas concentration of the internal combustion engine is equal to or greater than the predetermined value. Thus, if the burned gas concentration is less than the predetermined value after the cranking operation, the residual gas, which exists in each cylinder of the internal combustion engine, is flown not to the downstream side of the exhaust path through the exhaust valve or the exhaust throttle valve, but to the intake path through the intake valve. Here, the "burned gas concentration" of the present invention is the concentration of a gas generated after a fuel-air mixture is already burned in the expansion stroke (i.e. combustion stroke) of the internal combustion engine, and it is CO2 (carbon dioxide) concentration, for example. The "predetermined value" of the present invention is a value for determining the lower limit of the burned gas concentration. The burned gas concentration may be set in advance as a value which satisfies the emission control requirement, or it may be changed on the basis of the number of revolutions of the internal combustion engine, the fuel injection quantity, or the like, for example. The residual gas flown to the intake path in this manner is sucked into the cylinder again with the fuel and the air newly supplied, in the next intake stroke. Thus, the unburned HC included in the residual gas is burnt again in the cylinder of the internal combustion engine, to thereby increase the burned gas concentration. The outflow of the residual gas to the intake path and the subsequent combustion described above are repeated until the burned gas concentration is equal to or greater than the predetermined value. Therefore, it is possible to inhibit or prevent the unburned HC included in the residual gas from being emitted to the exterior of the internal combustion engine, after the cranking operation. It is effective because the residual gas during the cranking operation and immediately after the cranking operation highly likely includes the unburned HC more than the exhaust gas of the internal combustion engine in the normal operating condition does. Incidentally, if the burned gas concentration becomes equal to or greater than the predetermined value, the internal combustion engine becomes in the normal operating condition.

In one aspect of the second control apparatus for an internal combustion engine of the present invention, the intake valve controlling device has a concentration estimating device for estimating the burned gas concentration.

By virtue of such construction, it is possible to control the intake valve to be open, in the first term determined in accordance with the estimated burned gas concentration.

In another aspect of the second control apparatus for an internal combustion engine of the present invention, the concentration estimating device estimates the burned gas concentration on the basis of carbon dioxide concentration in an intake tube communicated with the intake valve.

By virtue of such construction, it is possible to estimate the burned gas concentration, by using the carbon dioxide concentration which is detected by a carbon dioxide concentration sensor mounted on the intake tube, or which is estimated from another parameter having a particular relationship with the carbon dioxide concentration.

In another aspect of the second control apparatus for an internal combustion engine of the present invention, the intake valve controlling device sets the predetermined value variable, in accordance with one or a plurality of parameters for defining the operating condition.

By virtue of such construction, the predetermined value is set variable in accordance with the one or the plurality of parameters for defining the operating condition of the internal combustion engine, such as the number of engine revolutions and the amount of fuel, for example. Thus, it is possible to use the more proper first period, depending on the operating condition.

In another aspect of the first and second control apparatuses for an internal combustion engine of the present invention, the internal combustion engine is divided into a plurality of cylinders, the variable valve operating mechanism has a valve operating apparatus for converting a rotational motion outputted from a valve driving source to a linear motion by using a motion converting device disposed in each of the plurality of cylinders and for open/close driving the intake valve and the exhaust valve of each of the plurality of cylinders by using the linear motion, and the valve operating apparatus is provided with: an electric motor shared as the valve driving source by a cylinder group provided with a plurality of cylinders whose valve open periods are not overlapped; and a transfer mechanism for transferring rotation of the electric motor to a body of revolution of each motion converting device of the cylinder group.

According to this aspect, the electric motor as the valve driving source is shared among the plurality of cylinders, so that the valve operating apparatus is reduced in size, as compared to the case where the electric motor is provided for each cylinder, to thereby relax the regulations in mounting it on an automobile. Moreover, the valve open periods are not overlapped among the cylinders in the cylinder group which shares the electric motor, and there is the period that all the valves are close, in the valve open period of each valve. Therefore, if the valve operating characteristics of the valve (intake valve or exhaust valve) in any of all the cylinders included in the same cylinder group are changed by changing the rotational speed and the rotational direction of the electric motor, it is possible to eliminate an influence of the change in the valve operating characteristics of the valve to be previously opened, on the valve operating characteristics of the valve to be opened next, by giving the electric motor a further change to cancel the previously given change, with regard to the rotation of the electric motor, by using the period from when the valve is closed to when the next valve of the cylinder is opened (i.e. the period that all the valves are closed). By this, it is possible to maintain high degree of freedom for the control of the valve operating characteristics related to each cylinder. By controlling such a valve operating apparatus as the above-mentioned variable valve operating mechanism, it is possible to inhibit or prevent the unburned HC from being emitted to the exterior of the internal combustion engine.

In another aspect of the first and second control apparatuses for an internal combustion engine of the present invention, the intake valve controlling device controls the variable valve operating mechanism to set the intake valve continuously open while a lift amount is maintained to a predetermined lift amount, during the cranking operation.

According to this aspect, the cranking is performed while the lift amount of the intake valve is maintained to the predetermined lift amount. Therefore, even at the start, the temperature preferably increases in each part of the internal combustion engine, the evaporation of the fuel is accelerated, and the unburned fuel is avoided. Thus, it is possible to more greatly reduce the exhaust emissions of the unburned HC of the internal combustion engine. The "predetermined lift amount" herein may be determined in advance by experiments or by simulation, as the lift amount which causes the fuel temperature to increase to a suitable temperature for the evaporation, on the basis of a relationship between the lift amount of the intake valve and the increased temperature of the air in the cylinder and the intake path. This relationship is caused by the fact that as the lift amount reduces more, the pumping loss increases more, and the energy loss there contributes to the increase in the intake temperature. Moreover, a small amount of margin may be set to the lift amount, and additionally, it may be changed afterward by learning. Incidentally, although "it is maintained", the lift amount does not necessarily remain fixed to the predetermined lift amount. Namely, it is a comprehensive concept allowing a small amount of change from the predetermined lift amount, as long as the temperature of the air in the cylinder and the intake path increases to a greater or lesser extent.

In an aspect of the first and second control apparatuses for an internal combustion engine in which the lift amount is maintained to the predetermined lift amount, as described above, the control apparatus may be further provided with: a temperature specifying device for specifying an actual temperature of cooling water for cooling the internal combustion engine; and a target temperature setting device for setting a target temperature of the cooling water to be reached during the cranking operation, the intake valve controlling device setting the predetermined lift amount, on the basis of a deviation between the actual temperature and the target temperature.

According to this aspect, firstly, the actual temperature of the cooling water is specified by the temperature specifying device with a water temperature sensor or the like, for example. The "actual temperature of the cooling water" is one example of physical quantity for indirectly specifying the temperature of the air in the cylinder and the intake path. Namely, it can be said that this is physical quantity aiming at the indirect specification of whether the internal combustion engine is at the evaporation temperature of the fuel injected after the cranking operation. As long as this purpose can be achieved, another physical quantity may be specified. Simultaneously or in tandem with this, the target temperature of the cooling water to be reached during the cranking operation is set by the target temperature setting device with a controller or the like, for example. The "target temperature" herein may be determined in advance by experiments or by simulation, as the target temperature of the cooling water at which the evaporation of the fuel can be preferably accelerated. Moreover, a small amount of margin may be set to the target temperature, and additionally, it may be changed afterward by learning. The predetermined lift amount is set on the basis of the deviation between the actual temperature of the cooling water, as specified or set above, and the target temperature, to thereby perform the cranking.

A relationship between the deviation and the predetermined lift amount is known by a controller, typically from a map set in advance, or as an expression set in advance. Therefore, the predetermined lift amount can be set, easily or quickly, on the basis of the deviation. Thus, the intake valve is set continuously open while the lift amount is maintained to the predetermined lift amount set in the above manner, under the control of the intake valve controlling device, during the cranking operation. Thus, the target temperature can be preferably achieved, relatively efficiently, the evaporation of the fuel is accelerated, and the unburned fuel is avoided. Thus, it is possible to more greatly reduce the exhaust emissions of the unburned HC of the internal combustion engine.

In an aspect of the first and second control apparatuses for an internal combustion engine in which the predetermined lift amount is set on the basis of the deviation between the actual temperature and the target temperature, as described above, if the deviation is greater than a maximum increased temperature corresponding to a maximum pumping loss in the internal combustion engine, the intake valve controlling device may set a lift amount corresponding to the maximum pumping loss as the predetermined lift amount, instead of setting the predetermined lift amount on the basis of the deviation.

According to this aspect, if the deviation is greater, the lift amount corresponding to the maximum pumping loss is used, so that it is possible to increase the temperature which can increase in one stroke during the cranking operation as much as possible, and end up reducing the number of strokes necessary to achieve the goal. For example, it is assumed that the "maximum increased temperature corresponding to the maximum pumping loss" is 150 [° C./stroke], for example, and the "lift amount corresponding to the maximum pumping loss" is 1 [mm], for example. In the case where the deviation is 150 [° C.], if the cranking is performed over 150 [° C.]/50 [° C./stroke]=3 [stroke] (e.g. the intake stroke, the compression stroke, and the expansion stroke) while the lift amount is maintained to 1 [mm], it is possible to achieve the target temperature, more quickly than the case where the lift amount is set to another lift amount. At this time, if the number of strokes has fractions, the lift amount may be changed, as occasion demands, from the lift amount corresponding to the maximum pumping loss.

Incidentally, the "lift amount corresponding to the maximum pumping loss" may be determined by experiments or by simulation, as the lift amount which literally maximizes the pumping loss, in a limited sense. In a broad sense, it may be allowed some margin, as long as the increased temperature due to the pumping loss is expected to a greater or lesser extent. In addition, the lift amount may be also changed afterward by learning.

Incidentally, if the deviation is not greater than the maximum increased temperature corresponding to the maximum pumping loss in the internal combustion engine, it is not necessarily advantageous to set the lift amount to the amount corresponding to the maximum pumping loss, as described above, in terms of heat efficiency. Therefore, in this case, the intake valve controlling device would rather perform the process based on the deviation, as described above, and then set the lift amount, as occasion demands.

In an aspect of the first and second control apparatuses for an internal combustion engine in which the target temperature is set, as described above, the target temperature setting device may correct the set target temperature, in accordance with a specific gravity of fuel which contributes combustion in the internal combustion engine.

According to this aspect, considering that the specific gravity of the fuel and the content ratio of crude fuel have a correlation and that a difficulty in evaporating the fuel can be indirectly specified by the specific gravity of the fuel, the target temperature is corrected in accordance with the specific gravity, such as by increasing the target temperature in accordance with the specific gravity of the fuel if using the fuel which is relatively difficult to evaporate, such as the crude fuel, for example. Alternatively, in contrast, the target temperature is corrected in accordance with the specific gravity, such as by reducing the target temperature in accordance with the specific gravity of the fuel if using the fuel which is relatively easy to evaporate. By this, regardless of the crude fuel, it is possible to sufficiently evaporate the fuel, to thereby more certainly reduce the exhaust emissions of the unburned HC of the internal combustion engine.

Alternatively, in an aspect of the first and second control apparatuses for an internal combustion engine in which the target temperature is set, as described above, the target temperature setting device may correct the set target temperature, in accordance with a dielectric constant of fuel.

According to this aspect, considering that the dielectric constant of the fuel and alcohol concentration in the fuel have a correlation and that the difficulty in evaporating the fuel can be indirectly specified by the dielectric constant of the fuel, the target temperature is corrected in accordance with the dielectric constant of the fuel, such as by increasing the target temperature in accordance with the dielectric constant of the fuel if using the fuel which is relatively difficult to evaporate, such as the fuel with a high alcohol concentration, for example. Alternatively, in contrast, the target temperature is corrected in accordance with the dielectric constant of the fuel such as by reducing the target temperature in accordance with the dielectric constant of the fuel if using the fuel which is relatively easy to evaporate, such as the fuel with a low alcohol concentration, for example. By this, regardless of the alcohol concentration in the fuel, it is possible to sufficiently evaporate the fuel, to thereby more certainly reduce the exhaust emissions of the unburned HC of the internal combustion engine.

These effects and other advantages of the present invention become more apparent from the following embodiments.

BRIEF DESCRIPTION OF DRAWINGS

FIG. 1 is a schematic diagram showing the structure of an engine provided with a control apparatus in a first embodiment.

FIG. 2 is an explanatory diagram showing the valve operating characteristics of an intake valve and an exhaust valve in the first embodiment.

FIG. 3 is a flowchart showing the operation process of the control apparatus in the first embodiment.

FIG. 4 is a perspective view showing a valve operating apparatus in the first embodiment.

FIG. 5 are diagrams showing a relationship between a valve open timing and a crank angle in each cylinder of the engine in the first embodiment.

FIG. 6 is a partially exploded view showing the valve operating apparatus in the first embodiment.

FIG. 7 is a cross sectional view showing the valve operating apparatus in the first embodiment.

FIG. 8 is a view showing overlapped cams in the same cylinder group.

FIG. 9 is a view showing a torque reduction mechanism.

FIG. 10 is a view showing a reversed-phase cam provided for the torque reduction mechanism.

FIG. 11 is a schematic diagram showing the structure of an engine provided with a control apparatus in a second embodiment.

FIG. 12 is an explanatory diagram showing the valve operating characteristics of the intake valve and the exhaust valve in the second embodiment.

FIG. 13 is a flowchart showing the operation process of the control apparatus in the second embodiment.

FIG. 14 is a graph showing a relationship between $CO_2$ concentration and torque change.

FIG. 15 is a schematic diagram showing the structure of an engine provided with a control apparatus in a third embodiment.

FIG. 16 is an explanatory diagram showing the valve operating characteristics of the intake valve and an exhaust throttle valve in the third embodiment.

FIG. 17 is a flowchart showing the operation process of the control apparatus in the third embodiment.

FIG. 18 is a schematic diagram showing the structure of an engine provided with a control apparatus in a fourth embodiment.

FIG. 19 is a characteristic diagram showing a relationship between the lift amount of the intake valve and an increased temperature and a pumping loss in the fourth embodiment.

FIG. 20 are schematic diagrams showing a flow of intake gas in an intake/expansion stroke and a compression/exhaust stroke, in the fourth embodiment.

FIG. 21 is an explanatory diagram showing the valve operating characteristics of the intake valve and the exhaust valve in the fourth embodiment.

FIG. 22 is a flowchart showing one portion of the operation principle of the control apparatus in the fourth embodiment, as a sub routine.

DESCRIPTION OF REFERENCE CODES

2 . . . cylinder,
10 . . . valve operating apparatus,
100 . . . control apparatus,
110 . . . intake valve control device, 120 ... exhaust vale control device,
200 ... engine,
202 ... ignition plug,
203 ... intake valve,
204 ... exhaust valve,
206, 234 ... intake tube,
210 ... exhaust tube,
211 ... injector,
130 ... target temperature setting device,
2012 ... water temperature sensor,
2231 ... specific gravity sensor,
2232 ... dielectric sensor

BEST MODE FOR CARRYING OUT THE INVENTION

Hereinafter, the best mode for carrying out the present invention will be discussed in order for each embodiment, with reference to the drawings.

First Embodiment

The control apparatus in the first embodiment will be explained with reference to FIG. 1 to FIG. 10.

<<Entire Structure>>

Firstly, the entire structure of an engine provided with the control apparatus in the first embodiment will be explained with reference to FIG. 1 and FIG. 2. FIG. 1 is a schematic diagram showing the structure of the engine provided with the control apparatus in the first embodiment. FIG. 2 is an explanatory diagram showing the valve operating characteristics of an intake valve and an exhaust valve in the first embodiment.

In FIG. 1, an engine 200 as one example of the "internal combustion engine" of the present invention, is a four-cycle engine of a reciprocal type, and it is of an inline four-cylinder type in which four cylinders 2 are aligned. Incidentally, FIG. 1 shows only one cylinder out of the four cylinders; however, the other cylinders also have substantially the same structure.

As shown in FIG. 2, a cylinder 201, an intake tube 206, and an exhaust tube 206 are formed in the cylinder 2.

The cylinder 201 is constructed to explode a fuel-air mixture by using an ignition plug 202 within the cylinder 201. A reciprocating motion of a not-illustrated piston caused by the explosion is converted to the rotational motion of a not-illustrated crank shaft.

In the intake tube 206, the communication condition with the inside of the cylinder 201 is controlled by opening/closing an intake valve 203. Therefore, in the intake tube 206, the air sucked from the exterior (i.e. intake air) and the fuel injected from an injector 211, which is a fuel injection apparatus, are mixed (i.e. the fuel-air mixture is formed), and it is supplied to the cylinder 201 through the intake valve 203. Incidentally, each cylinder 2 is provided with two intake valves 203 and two exhaust valves 204; however, FIG. 1 shows only one of each.

The air from the exterior is supplied to the intake tube 206 of the cylinder 2 through an intake tube 234. The intake tube 234 is divided into four in the middle, and each is connected to respective one of the intake tubes 206 of the four cylinders 2. Moreover, in the middle or the intake tube 234, there is provided a throttle and an air flow meter, which are not illustrated. The throttle is constructed to control the amount of air, by electronically controlling the extent of throttle opening. The air flow meter is disposed in front of the throttle in the intake tube 234 and measures the amount of intake air.

The injector 211 is disposed, for each cylinder, in the intake tube 206 after the division. By this, it is possible to control injection quantity and an accidental fire for each cylinder. Incidentally, the injector 211 may be disposed in the intake tube 234 before the division, or may be disposed within each cylinder.

An exhaust tube 210 is constructed to emit the exhaust gas generated within the cylinder 201, through the exhaust valve. The exhaust gas from the exhaust tube 210 of the cylinder 2 is emitted to the exterior through an exhaust tube and a catalyst, connected to each of the other exhaust tubes 210 and collecting the exhaust gas. The catalyst is a so-called ternary catalyst and has a function of reducing CO (carbon monoxide), HC (hydrocarbon), and NOx (oxidized nitrogen) in the exhaust gas. The catalyst includes platinum and rhodium, for example.

As shown in FIG. 1, particularly in the first embodiment, the engine 200 is provided with a valve operating apparatus 10. As described later with reference to FIG. 4, the valve operating apparatus 10 is constructed to change the valve operating characteristics of the intake valve 203 and the exhaust valve 204 of each of the four cylinders 2. Incidentally, a variable valve operating mechanism may be any mechanism if capable of controlling the open/close timing of the intake valve and the exhaust valve. A cam-by-wire, an electromagnetic drive valve, or the like can be used.

In FIG. 1, a control apparatus 100 is provided with: an intake valve control device 110; an exhaust valve control device 120; an ignition control device 202C; and a fuel injection control device 211C, and the control apparatus 100 controls the entire operation of the engine 200. These are preferably constructed as a logical operation circuit, centering on a known electronic control unit (ECU), a central processing unit (CPU), a read-only memory (ROM) with a control program stored, a random access memory (RAM) with various data stored, or the like. Moreover, it is connected through a bus to an input port for receiving an input signal from various sensors (e.g. the number of revolutions N of the engine 200, a crank angle CA, etc.), and an output port for transmitting a control signal to various actuators of the valve operating apparatus 10 or the like.

The intake valve control device 110, as one example of the "intake valve controlling device" of the present invention, is constructed to control the valve operating apparatus 10 to set the intake valve 203 continuously open, during a cranking operation performed at the start of the engine 200 (or from the start of initiation control of the engine 200 until the ignition). In other words, it is possible to maintain the intake valve 203 open, throughout the intake, compression, expansion, and exhaust strokes, during the cranking operation, which is different from the normal operating condition of the engine 200. More specifically, in the first embodiment, as shown in FIG. 2, it is possible to set the intake valve 203 continuously open, in a period T1 which is during the cranking operation.

The exhaust valve control device 120 as one example of the "exhaust controlling device" of the present invention, is constructed to control the valve operating apparatus 10 to set the exhaust valve 204 continuously close, during the cranking operation performed at the start of the engine 200 (or from the start of initiation control of the engine 200 until the ignition). In other words, it is possible to maintain the exhaust valve 204 close, throughout the intake, compression, expansion, and exhaust strokes, during the cranking operation, which is different from the normal operating condition of the engine 200. More specifically, in the first embodiment, as shown in FIG. 2, it is possible to set the exhaust valve 204 continuously close, in the period T1 which is during the cranking operation.

The ignition control device 202C is constructed to control the ignition timing of the ignition plug 202.

The fuel injection control device 211C is constructed to control the fuel injection quantity, the fuel injection timing, or the like of the injector 211.

The control apparatus 100 controls the valve operating apparatus 10 to set the intake valve 203 and the exhaust valve 204 in the normal operating condition, after the cranking operation is ended; in other words, after the ignition of the engine 200. Namely, as shown in FIG. 2, in a period T2 which is after the cranking operation (i.e. periods T2a, T2b, T2c, and T2d), the intake valve 203 and the exhaust valve 204 are in the normal operating condition. Specifically, in the period T2a corresponding to the intake stroke, the intake valve 203 is open and the exhaust valve 204 is close. In the period T2b corresponding to the compression stroke and the period T2c corresponding to the expansion stroke, the intake valve 203 and the exhaust valve 204 are close. In the period T2d corresponding to the exhaust stroke, the intake valve 203 is close and the exhaust valve 204 is open. Incidentally, the overlap of the period T2a and the T2b, and the overlap of the period T2c and the period T2d may be also set, as occasion demands.

<<Operation Process>>

Next, the operation process of the control apparatus in the first embodiment will be explained with reference to FIG. 3, in addition to FIG. 1 and FIG. 2. FIG. 3 is a flowchart showing the operation process of the control apparatus in the first embodiment.

In FIG. 3, firstly, it is judged whether or not the engine 200 is initiation-controlled (step S11). Namely, it is judged by the control apparatus 100 whether or not the cranking operation is started. If it is judged that the engine 200 is not initiation-controlled (i.e. the engine 200 is not started) (the step S11: NO), the control apparatus 100 ends the operation process. On the other hand, if it is judged that the engine 200 is initiation-controlled (the step S11: YES), it is judged whether or not the fuel injection by the injector 211 and the ignition by the ignition plug 202 are performed in the engine 200 (step S12). Namely, it is judged whether or not the cranking operation is ended. If it is judged that the cranking operation is not ended (i.e. it is during the cranking operation) (the step S12: NO), the valve operating apparatus 10 is controlled to set the intake valve 203 continuously open by using the intake valve control device 110, and valve operating apparatus 10 is controlled to set the exhaust valve 204 continuously close by using the exhaust valve control device 120 (step S13). After that, the above-mentioned operation process in the step S11 is performed again. Namely, during the cranking operation of the engine 200, a series of operation processes between the step S11 and the step S13 is repeated. Namely, as shown in FIG. 2, in the period T1 which is during the cranking operation, the valve operating apparatus 10 is controlled by the control apparatus 100 such that the intake valve 203 is continuously open and the exhaust valve 204 is continuously close. Thus, by the cranking operation, the residual gas including unburned HC before the cranking operation, which exists in each cylinder 2 of the engine 200, is flown not to the exhaust tube 210 through the exhaust valve 204, but to the intake tube 206 through the intake valve 203. The residual gas flown to the intake tube 206 in this manner is sucked into the cylinder 2 again with the fuel and the air newly supplied from the injector 211, in the intake stroke of the engine 200 in the normal operating condition after the cranking operation described later. Thus, the unburned HC included in the residual gas before the cranking operation is burnt in the cylinder 2 of the engine 200. Therefore, it is possible to inhibit or prevent the unburned HC included in the residual gas before the cranking operation from being emitted to the exterior of the engine 200 through the exhaust path, such as the exhaust tube 210, by the cranking operation. On the other hand, if it is judged that the cranking operation is ended (i.e. it is not during the cranking operation) (the step S12: YES), the intake valve 203 and the exhaust valve 204 are controlled by the control apparatus 100 to be in the normal operating condition (step S14). Namely, as described above with reference to FIG. 2, in the period T2 which is after the cranking operation, the intake valve 203 and the exhaust valve 204 are set in the normal operating condition.

Next, the structure and the operation principle of the valve operating apparatus in the first embodiment will be explained with reference to FIG. 4 to FIG. 10.

FIG. 4 shows the valve operating apparatus in the first embodiment. The engine 200, as described above, is of an inline four-cylinder type in which four cylinders 2 are aligned. In FIG. 4, each of the cylinders 2 is numbered with #1 to #4 from one end to the other in their alignment direction, to thereby distinguish them. Generally, in the four-cycle engine 200 of an inline four-cylinder type, the explosion interval of an outer pair of cylinders 2 (#1, #4) is shifted by 360° CA (which means a crank angle, and the same is true for the others below), and the explosion timing of an inner pair of cylinders 2 (#2, #3) is shifted by 180° CA and 540° CA, respectively, on the basis of the explosion timing of ht cylinder 2-#1, to thereby realize regular interval explosion of 180° CA each. Incidentally, which explosion timing of the cylinder 2-#2 and the cylinder 2-#3 comes first, may be appropriately determined. Here, the explanation is given under the assumption that the explosion timing of the cylinder 2-#2 is earlier than that of the cylinder 2-#3. Therefore, the explosion order of the engine 200 is #1→#3→#4→#2.

The two intake valves 203 are provided in each cylinder 2. The illustration of the exhaust valve 204 is omitted. The intake valve 203 is open/close-driven by the valve operating apparatus 10. As is well known, the intake valve 203 is provided in a reciprocable manner in the axis direction of a stem 203a, by disposing the stem 203a through the stem guide of a cylinder head, which is not illustrated. As shown in FIG. 7, on the upper end of the intake 203, there is mounted a valve lifter 4 so as to reciprocate integrally with the intake valve 203. Between the valve lifter 4 and the cylinder head, a valve spring 4 is disposed. In the intake valve 203, a valve face 203b is attached firmly to the valve sheet of an intake port in the valve close direction by repulsion to the compression of the valve spring 5. The valve operating apparatus 10 drives the intake valve 203 in the valve open direction against the force of the valve spring.

FIG. 5(a) shows a correspondence relationship between the lift amount of the intake valve 203 in each cylinder 2 (the amount of displacement in the valve open direction based on the valve close status) and the crank angle. The working angle of each intake valve 203 (which is a value, expressed by the crank angle, of the period that the valve is open) is adjusted, as occasion demands, depending on the specifications of the engine 200. Moreover, on the valve operating apparatus provided with the variable valve operating mechanism, the working angle is changed, depending even on the operating condition of the engine 200. In general, the working angle of the intake valve 203 is set to about 240° CA. According to the setting of the working angle as described above, as shown in FIG. 5(b), the valve open periods are not overlapped with each other between the outer pair of cylinders (#1, #4). Moreover, as shown in FIG. 5(c), the valve open periods are not overlapped with each other between the inner pair of cylinders (#2, #3). Thus, as shown in FIG. 4, in the valve operating apparatus 10, the outer pair of cylinders 2 is regarded as a first cylinder group, and the inner pair of cylinders 2 is regarded as a second cylinder group, to thereby distinguish them. Moreover, a first electric motor 11 and a second electric motor 12 are provided, as a valve driving source, for each cylinder.

FIG. 6 and FIG. 7 show the details of the valve operating apparatus 10. As shown in these drawings, the valve operating apparatus 10 is provided with: the above-mentioned electric motors 11 and 12; a cam mechanism 13, as a motion converting device provided for each intake valve 203; and a first transfer mechanism 14 and a second transfer mechanism 15 for transferring the rotational motion of each of the electric motors 11 and 12 to the cam mechanism 13 of the corresponding cylinder group. All the cam mechanisms 13 have the same structure. The cam mechanism 13 has a cam 16, as a body of revolution. By virtue of the cam 16, the valve lifter 4 on the upper end of the intake valve 203 is pressed, to thereby drive the intake valve 203 in the valve open direction. Namely, the valve lifter 4 functions as a joint driven by the cam 16. The profile on the outer circumference of the cam 16 is set to a known shape in which an expanded nose portion 16b is provided for one portion of a base circle 16a, as shown in FIG. 8. The valve lifter 4 is pressed by the nose portion 16b.

The first transfer mechanism 14 has: a cam shaft (a first transfer shaft) 17 for coupling the cams 16 of the outer cylinders (#1 and #4); and a reduction mechanism 18 for transferring the rotation of the electric motor 11 to the cam shaft 17. The reduction mechanism 18 has: a motor gear 19 combined with an output shaft 11a of the electric motor 11; and a driven gear 20, disposed in an integrally rotatable manner on one end of the cam shaft 17 and engaged with a motor gear 19. The cam shaft 17 has a coupling structure of combining a first shaft 21 and a second shaft 22, wherein the first shaft 21 drives the cam 16 of the cylinder #1 and the second shaft 22 drives the cam 16 of the cylinder #4. On the first shaft 21, there is concentrically and integrally formed a coupling shaft 23 which passes above the cylinders #2 and #3 and which extends to the cylinder #4. A shaft joint 24 on the end of the coupling shaft 23 is concentrically put in a shaft joint hole 25 of the second shaft 22, to thereby concentrically couple both the shafts 21 and 22. Between the shaft joint 24 and the shaft joint hole 25, there is provided a baffling device, such as a spline, to thereby couple the first shaft 21 and the second shaft 22 in an integrally rotatable manner. Incidentally, the coupling shaft 23 has a smaller diameter than that of the first shaft 21 and the second shaft 22. The cam 16 is integrally formed with the first shaft 21 and the second shaft 22; however, the cam 16 may be formed as a different part from the first shaft 21 and the second shaft 22 and fixed on the shafts 21 and 22 by using a fixing device, such as injection and a shrinkage fit.

On the other hand, the second transfer mechanism 15 has: a cam shaft (a second transfer shaft) 30 for coupling the cams 16 of the inner cylinders (#2 and #3); and a reduction mechanism 31 for transferring the rotation of the electric motor 12 to the cam shaft 30. The reduction mechanism 31 has: a motor gear 32 combined with an output shaft 12a of the electric motor 12; a middle gear 33 engaged with the motor gear 32; and a driven gear 34 disposed in an integrally rotatable manner in the middle of the cam shaft 30 and engaged with the middle gear 33. The cam shaft 30 is formed in a hollow shaft shape, provided with a through bore 30a extending in the shaft direction. On the circumference thereof, the cam 16 is integrally formed. The coupling shaft 23 of the cam shaft 17 is rotatably inserted into the through bore 30a of the cam shaft 30. By this, the cam shaft 30 is concentrically disposed in a rotatable manner, on the outer circumference of the cam shaft 17. Incidentally, the outer diameter of the coupling shaft 30 is the same as that of the first shaft 21 and the second shaft 22 of the cam shaft 17. The cam 16 may be formed as a different part from the cam shaft 30 and fixed on the cam shaft 30 by using a fixing device, such as injection and a shrinkage fit. The same is true for the driven gear 34.

The cam 16 of one cylinder (#1 or #3) of the same cylinder group and the cam 16 of the other cylinder (#2 or #4) are coupled with the cam shaft 17 or 30 such that the apexes 16c of their nose portions 16b are shifted by 180° to each other in the circumferential direction. This is because the valve open timing of the intake valve 203 is shifted by 360° CA between these cylinders 2. As is clearly seen from FIG. 8, this causes a range X in which the nose portions 16b of the cams are not overlapped, with regard to the circumferential direction of each of the cam shafts 17 and 30. Incidentally, the diameter of the base circle 16a is set to provide a gap (valve clearance) between the base circle 16a and the valve lifter 4. Incidentally, the cam mechanism 13 may be disposed on a crank case side, and the linear motion obtained there may be transferred to the intake valve 203 by using a motion transfer member, such as a push rod. In other words, the engine 200 is not necessarily limited to an OHC type but may be of an OHV type.

Each of the transfer mechanisms 14 and 15 is provided with a torque reduction mechanism 40. As shown in detail in FIG. 9, the torque reduction mechanism 40 is provided with: a reversed-phase cam 41; and a torque loading apparatus 42 for putting a load caused by friction onto the outer circumference of the reversed-phase cam 41. Incidentally, FIG. 9 shows the torque reduction mechanism 40 for the cylinder #2 and the cylinder #3. The torque reduction mechanism 40 for the cylinder #1 and the cylinder #4 also has the same structure. The reversed-phase cam 41 is disposed on the edge portion of the second shaft 22 of the cam shaft 17 and on the edge portion of the cam shaft 30, in an integrally rotatable manner. The reversed-phase cam 41 may be integrally molded with the shafts 17 and 30, or may be formed as a different part from the shafts 17 and 30 and fixed on the shafts 17 and 30 by using a fixing device, such as injection and a shrinkage fit. The outer circumferential surface of the reversed-phase cam 41 is constructed as a cam surface. The profile of the cam surface, as shown in FIG. 10, is set in the shape that a pair of concave portions 41b is provided for one portion of the base circle 41. The concave portions 41b are provided such that their bottom 41c are away from each other by 180° in the circumferential direction.

Back in FIG. 9, the torque loading apparatus 42 is provided with: a lifter 43 facing the outer circumferential surface of the reversed-phase cam 41; a spring bearing 44 disposed on the outer side of the lifter 43; and a coil spring 45, disposed between the lifter 43 and the spring bearing 44 and applying an elastic force to the lifter 43 to move toward the reversed-phase cam 41. On the end of the lifter 43, there is rotatably mounted a roller 46, and this roller 46 is pressed to the outer circumferential surface of the reversed-phase cam 41 by the repulsion of the coil spring 45.

The lifter 43 corresponding to the reversed-phase cam 41 of the cam shaft 17 is positioned, with regard to the circumferential direction of the cam shaft 17, such that when the roller 46 is in contact with the bottom 41c of one of the concave portions 41b provided for the reversed-phase cam 41, the apex 16c of the nose portion 16b of the cam 16 for the cylinder #1 mounted on the cam shaft 17 is in contact with the valve lifter 4 for the cylinder #1, and such that when the roller 46 is in contact with the bottom 41c of the other concave portion 41b, the apex 16c of the nose portion 16b of the cam 16 for the cylinder #4 mounted on the cam shaft 17 is in contact with the bottom 41c of the concave portion 41b of the valve lifter 4 for the cylinder #4. Moreover, the lifter 43 corresponding to the reversed-phase cam 41 of the cam shaft 30 is positioned, with regard to the circumferential direction of the cam shaft 30, such that when the roller 46 is in contact with the bottom 41c of one of the concave portions 41b provided for the reversed-phase cam 41, the apex 16c of the nose portion 16b of the cam 16 for the cylinder #3 mounted on the cam shaft 30 is in contact with the valve lifter 4 for the cylinder #3, and such that when the roller 46 is in contact with the bottom 41c of the other concave portion 41b, the apex 16c of the nose portion 16b of the cam 16 for the cylinder #2 mounted on the cam shaft 30 is in contact with the bottom 41c of the concave portion 41b of the valve lifter 4 for the cylinder #2.

According to the valve operating apparatus 10 constructed in this manner, by the electric motors 11 and 12 continuously driving the respective cam shafts 17 and 30 in one direction at the half speed of the rotational speed of the crank shaft of the engine 200, it is possible to open/close-drive the intake valve 203 in synchronization with the rotation of the crank shaft, in the same manner as a commonly-used mechanical valve operating apparatus for driving the valve with the power from the crank shaft.

With regard to the exhaust valve 204, there is provided the valve operating apparatus 10 in the same manner, and it can be open/close-driven by the valve operating apparatus 10.

Incidentally, the first embodiment can adopt not only the variable valve operating mechanism but also various mechanisms, such as a cam by wire and an electromagnetic drive valve, which already exist or which will be developed, as the valve operating apparatus 10, if they can control the open/close timing of the intake valve and the exhaust valve.

Second Embodiment

Next, the control apparatus in the second embodiment will be explained with reference to FIG. 11 to FIG. 14.

<<Entire Structure>>

Firstly, the entire structure of an engine provided with the control apparatus in the second embodiment will be explained with reference to FIG. 11 and FIG. 12. FIG. 11 is a schematic diagram showing the structure of the engine provided with the control apparatus in the second embodiment. FIG. 12 is an explanatory diagram showing the valve operating characteristics of the intake valve and the exhaust valve in the second embodiment. Incidentally, in FIG. 11 and FIG. 12, the same constituent elements as those in the first embodiment shown in FIG. 1 and FIG. 2 carry the same numerical references, and their explanation is omitted, as occasion demands.

In FIG. 11, an engine 220 is different from the engine 200 described above with reference to FIG. 1, in the point that there is provided a CO2 concentration sensor 213 for detecting the CO2 concentration of the intake air in the intake tube 206.

In FIG. 11, a control apparatus 102 is provided with: an intake valve control device 112; and an exhaust valve control device 122, and it controls the entire operation of the engine 220. As in the control apparatus 100 described with reference to FIG. 1, these are preferably constructed as a logical operation circuit, centering on a known ECU, a CPU, a ROM with a control program stored, a RAM with various data stored, or the like. Moreover, it is connected through a bus to an input port for receiving an input signal from various sensors, such as the CO2 concentration sensor, and an output port for transmitting a control signal to various actuators of the valve operating apparatus 10 or the like.

The intake valve control device 112 as one example of the "intake valve controlling device" of the present invention, is constructed to control the valve operating apparatus 10 to set the intake valve 203 continuously open, during the cranking operation performed at the start of the engine 220, as in the intake valve control device 110 in the first embodiment. Thus, as shown in FIG. 12, it is possible to set the intake valve 203 continuously open, in the period T1 which is during the cranking operation. Moreover, particularly in the second embodiment, the intake valve control device 112 is constructed to control the valve operating apparatus 10 to set the intake valve 203 open in the exhaust stroke, in a period from after the cranking operation to the time that the CO2 concentration of the engine 220, as one example of the "burned gas concentration" of the present invention, is equal to or greater than a predetermined value. Namely, as shown in FIG. 12, in a period T3 from after the cranking operation to the time that the CO2 concentration of the engine 220 is equal to or greater than the predetermined value (i.e. periods T3a, T3b, T3c, and T3d), it is possible to set the intake valve 203 open in the period T3a corresponding to the intake stroke and in the period T3d corresponding to the exhaust stroke. Moreover, it is possible to set the intake valve 203 close in the period T3b corresponding to the compression stroke and in the period T3c corresponding to the expansion stroke. Incidentally, in the second embodiment, the value of the CO2 concentration, which is the combustion limit of the engine 220, is set in advance as the predetermined value.

The exhaust valve control device 122 as one example of the "exhaust controlling device" of the present invention, is constructed to control the valve operating apparatus 10 to set the exhaust valve 204 continuously close, during the cranking operation. Namely, as shown in FIG. 12, in the period T1 which is during the cranking operation, it is possible to set the exhaust valve 204 continuously close. Moreover, particularly in the second embodiment, the exhaust valve control device 122 is constructed to control the valve operating apparatus 10 to set the exhaust valve 204 close in the exhaust stroke, in the period from after the cranking operation to the time that the CO2 concentration of the engine 220 is equal to or greater than the predetermined value. Namely, as shown in FIG. 12, in the period T3, it is possible to set the exhaust valve 204 continuously close.

If the CO2 concentration is equal to or greater than the predetermined value, the control apparatus 102 controls the valve operating apparatus 10 to set the intake valve 203 and the exhaust valve 204 in the normal operating condition. Namely, as shown in FIG. 12, in a period T4 in which the CO2 concentration is equal to or greater than the predetermined value after the cranking operation (i.e. periods T4a, T4b, T4c, and T4d), the intake valve 203 and the exhaust valve 204 are set in the normal operating condition. Specifically, in the period T4a corresponding to the intake stroke, the intake valve 203 is set open, and the exhaust valve 204 is set close. In the period T4b corresponding to the compression stroke and the period T4c corresponding to the expansion stroke, the intake valve 203 and the exhaust valve 204 are set close. In the period T4d corresponding to the exhaust stroke, the intake valve 203 is set close, and the exhaust valve 204 is set open. Incidentally, the overlap of the period T4a and the T4b, and the overlap of the period T4c and the period T4d may be also set, as occasion demands.

<<Operation Process>>

Next, the operation process of the control apparatus in the second embodiment will be explained with reference to FIG. 13 and FIG. 14, in addition to FIG. 11 and FIG. 12. FIG. 13 is a flowchart showing the operation process of the control apparatus in the second embodiment. FIG. 14 is a graph showing a relationship between the CO2 concentration and the torque change. Incidentally, in FIG. 13, the same operation processes as those of the first embodiment shown in FIG. 3 carry the same numerical references, and their explanation is omitted, as occasion demands.

In FIG. 13, the operation process of the control apparatus 102 is different from the operation principle in the first embodiment described above with reference to FIG. 3, in the following point. Namely, if it is judged that the fuel injection by the injector 211 and the ignition by the ignition plug 202 are performed in the engine 220 (the step S12: YES), a series of operation processes in a step S21 and a step S22 are performed before the intake valve 203 and the exhaust valve 204 are controlled by the control apparatus 102 to be in the normal operating condition (the step S14).

Namely, if it is judged that the fuel injection by the injector 211 and the ignition by the ignition plug 202 are performed in the engine 220 (the step S12: YES), firstly, the valve operating apparatus 10 is controlled by the intake valve control device 112 to set the intake valve 203 open even in the exhaust stroke in addition to the intake stroke, and the valve operating apparatus 10 is controlled by the exhaust valve control device 122 to set the exhaust valve 204 continuously close (the step S21). Then, it is judged by the control apparatus 102 whether or not the CO2 concentration in the intake tube 206 is equal to or greater than a predetermined value (the step S22). If the CO2 concentration in the intake tube 206 is less than the predetermined value (the step S22: NO), the operation process in the step S21 is performed again. On the other hand, if the CO2 concentration in the intake tube 206 is equal to or greater than the predetermined value (the step S22: YES), the intake valve 203 and the exhaust valve 204 are controlled by the control apparatus 102 to be in the normal operating condition (the step S14). Namely, as shown in FIG. 12, in the period T3 from after the cranking operation to the time that the CO2 concentration of the engine 220 is equal to or greater than the predetermined value, the intake valve 203 is set open in the period T3a corresponding to the intake stroke and in the period T3d corresponding to the exhaust stroke. Moreover, the intake valve 203 is set close in the period T3b corresponding to the compression stroke and in the period T3c corresponding to the expansion stroke. The exhaust valve 204 is set continuously close. Thus, it is possible to inhibit or prevent the unburned HC included in the residual gas from being emitted to the exterior of the engine 220, after the cranking operation. It is effective because the residual gas immediately after the cranking operation highly likely includes the unburned HC more than the exhaust gas of the engine 200 in the normal operating condition does.

Here, as shown in FIG. 14, with regard to the predetermined value in the second embodiment, the CO2 concentration in the intake tube 206, which is the combustion limit, is set on the basis of the torque change. Namely, the predetermined value is set as the maximum value of the CO2 concentration in the range that the torque change is allowed. Thus, it is possible to prevent such a situation that the operation of the engine 220 is unstable because of too much CO2 concentration.

The predetermined value may be set variable, on the basis of the number of revolutions and the amount of fuel of the engine 220. Moreover, instead of the operation process of judging whether or not the CO2 concentration is equal to or greater than the predetermined value (the step S22), an operation process of judging whether or not O2 concentration in the intake tube 206 is less than a predetermined value, may be performed. In this case, the predetermined value may be set as the value of the O2 concentration, which is the combustion limit.

Incidentally, the second embodiment is designed such that the CO2 concentration is detected by the CO2 concentration sensor 213; however, the CO2 concentration may be also sequentially estimated by the control apparatus 102 from the volume of a serge tank disposed on the intake side and the amount of the burned gas blew back from the cylinder 2.

Third Embodiment

Next, the control apparatus in the third embodiment will be explained with reference to FIG. 15 to FIG. 17.

<<Entire Structure>>

Firstly, the entire structure of an engine provided with the control apparatus in the third embodiment will be explained with reference to FIG. 15 and FIG. 16. FIG. 15 is a schematic diagram showing the structure of the engine provided with the control apparatus in the third embodiment. FIG. 16 is an explanatory diagram showing the valve operating characteristics of the intake valve and an exhaust throttle valve in the third embodiment. Incidentally, in FIG. 15 and FIG. 16, the same constituent elements as those in the first embodiment shown in FIG. 1 and FIG. 2 carry the same numerical references, and their explanation is omitted, as occasion demands.

In FIG. 15, an engine 230 is different from the engine 220 described above with reference to FIG. 11, in the point that there is provided an exhaust throttle valve 212 in the middle of the exhaust tube 210. The exhaust throttle valve 212 can adjust the exhaust gas flow passing through the exhaust tube 210. The opening of the exhaust throttle valve 212 is controlled by a control apparatus 103.

In FIG. 15, the control apparatus 103 is provided with: an intake valve control device 113; and an exhaust throttle valve control device 140, and it controls the entire operation of the engine 230. As in the control apparatus 100 described with reference to FIG. 1, these are preferably constructed as a logical operation circuit, centering on a known ECU, a CPU, a ROM with a control program stored, a RAM with various data stored, or the like. Moreover, it is connected through a bus to an input port for receiving an input signal from various sensors, such as an A/F sensor, and an output port for transmitting a control signal to various actuators of the exhaust throttle valve 211.

The intake valve control device 113 as one example of the "intake valve controlling device" of the present invention, is constructed to control the valve operating apparatus 10 to set the intake valve 203 continuously open, during the cranking operation performed at the start of the engine 230, as in the intake valve control device 112 in the second embodiment. Thus, as shown in FIG. 16, it is possible to set the intake valve 203 continuously open, in the period T1 which is during the cranking operation. Moreover, particularly in the second embodiment, the intake valve control device 113 is constructed to control the valve operating apparatus 10 to set the intake valve 203 open in the exhaust stroke, in the period from after the cranking operation to the time that the CO2 concentration of the engine 230, as one example of the "burned gas concentration" of the present invention, is equal to or greater than a predetermined value. Namely, as shown in FIG. 16, in the period T3 from after the cranking operation to the time that the CO2 concentration of the engine 230 is equal to or greater than the predetermined value, it is possible to set the intake valve 203 open in the period T3a corresponding to the intake stroke and in the period T3d corresponding to the exhaust stroke. Moreover, it is possible to set the intake valve 203 close in the period T3b corresponding to the compression stroke and in the period T3c corresponding to the expansion stroke. Incidentally, in the third embodiment, the value of the CO2 concentration, which is the combustion limit of the engine 230, is set in advance as the predetermined value.

The exhaust throttle valve control device 140 as one example of the "exhaust controlling device" of the present invention, is constructed to set the exhaust throttle valve 212 continuously close, during the cranking operation. Namely, as shown in FIG. 16, in the period T1 which is during the cranking operation, it is possible to set the exhaust throttle valve 212 continuously close. Moreover, the exhaust throttle valve control device 140 is constructed to set the exhaust throttle valve 212 close, in the period from after the cranking operation to the time that the CO2 concentration of the engine 230 is equal to or greater than the predetermined value. Namely, as shown in FIG. 16, in the period T3, it is possible to set the exhaust throttle valve 212 continuously close.

If the CO2 concentration detected by the CO2 concentration sensor 213 is equal to or greater than the predetermined value, the control apparatus 103 controls the valve operating apparatus 10 and the exhaust throttle valve 212 to set the intake valve 203 and the exhaust throttle valve 212 in the normal operating condition. Namely, as shown in FIG. 16, in the period T4 in which the CO2 concentration is equal to or greater than the predetermined value after the cranking operation, the intake valve 203 and the exhaust throttle valve 212 are set in the normal operating condition. Specifically, in the period T4a corresponding to the intake stroke, the intake valve 203 is set open, and the exhaust throttle valve 212 is set close. In the period T4b corresponding to the compression stroke and the period T4c corresponding to the expansion stroke, the intake valve 203 and the exhaust throttle valve 212 are set close. In the period T4d corresponding to the exhaust stroke, the intake valve 203 is set close, and the exhaust throttle valve 212 is set open. Incidentally, the overlap of the period T4a and the T4b, and the overlap of the period T4c and the period T4d may be also set, as occasion demands.

<<Operation Process>>

Next, the operation process of the control apparatus in the third embodiment will be explained with reference to FIG. 17, in addition to FIG. 15 and FIG. 16. FIG. 17 is a flowchart showing the operation process of the control apparatus in the third embodiment. Incidentally, in FIG. 17, the same operation processes as those of the first embodiment shown in FIG. 3 carry the same numerical references, and their explanation is omitted, as occasion demands.

In FIG. 17, the operation process of the control apparatus 103 is different from the operation principle in the first embodiment described above with reference to FIG. 3, in the following points. Namely, if it is judged that the fuel injection by the injector 211 and the ignition by the ignition plug 202 are not performed in the engine 230 (the step S12: NO), an operation process in a step S31 is performed instead of the operation process in the step S13 (refer to FIG. 3). Moreover, if it is judged that the fuel injection by the injector 211 and the ignition by the ignition plug 202 are performed in the engine 230 (the step S12: YES), a series of operation processes in a step S32 to a step S24 is performed instead of the operation process in the step S14 (refer to FIG. 3). In other words, the operation process of the control apparatus 103 is different from that of the second embodiment described above with reference to FIG. 13, in the point that the operation processes associated with the exhaust throttle valve 212 (the step S31, the step S32, the step S33, and the step S34) are performed instead of the operation processes associated with the exhaust valve 204 (the step S13, the step S14, the step S21, and the step S22).

Namely, particularly in the third embodiment, if it is judged that the fuel injection by the injector 211 and the ignition by the ignition plug 202 are not performed in the engine 230, i.e. that it is during the cranking operation (the step S12: NO), the valve operating apparatus 10 is controlled by the intake valve control device 113 to set the intake valve 203 continuously open, and the exhaust throttle valve 212 is set continuously close by the exhaust throttle valve control device 140 (the step S31). After that, again, the above-mentioned operation in the step S11 is performed. Namely, during the cranking operation of the engine 230, a series of operation processes from the step S11 to the step S13 is repeated. Namely, as shown in FIG. 16, the valve operating apparatus 10 and the exhaust throttle valve 212 are controlled to set the intake valve 203 continuously open and to set the exhaust throttle valve 212 continuously close, in the period T1, which is during the cranking operation. Thus, by the cranking operation, the residual gas including unburned HC before the cranking operation, which exists in each cylinder 2 of the engine 230, is flown not to the downstream of the exhaust throttle valve 212 of the exhaust tube 210, but to the intake tube 206 through the intake valve 203. The residual gas flown to the intake tube 206 in this manner is sucked into the cylinder 2 again with the fuel and the air newly supplied from the injector 211, in the intake stroke of the engine 230 which is in the normal operating condition after the cranking operation. Thus, the unburned HC included in the residual gas before the cranking operation is burnt in each cylinder 2 of the engine 230. Therefore, it is possible to inhibit or prevent the unburned HC included in the residual gas before the cranking operation from being emitted to the exterior of the engine 230 through the exhaust path, such as the exhaust tube 210, by the cranking operation.

On the other hand, if it is judged that the fuel injection by the injector 211 and the ignition by the ignition plug 202 are performed in the engine 230 (the step S12: YES), firstly, the valve operation apparatus 10 is controlled by the intake valve control device 113 to set the intake valve 203 open even in the exhaust stroke in addition to the intake stroke, and the valve operating apparatus 10 is controlled by the exhaust throttle valve control device 140 to set the exhaust throttle valve 212 continuously close (the step S32). Then, it is judged by the control apparatus 103 whether or not the CO2 concentration in the intake tube 206 is equal to or greater than a predetermined value (the step S33). If the CO2 concentration in the intake tube 206 is less than the predetermined value (the step S33: NO), the operation process in the step S32 is performed again. On the other hand, if the CO2 concentration in the intake tube 206 is equal to or greater than the predetermined value (the step S33: YES), the intake valve 203 and the exhaust throttle valve 212 are controlled by the control apparatus 103 to be in the normal operating condition (the step S34). Namely, as shown in FIG. 16, in the period T3 from after the cranking operation to the time that the CO2 concentration of the engine 220 is equal to or greater than the predetermined value, the intake valve 203 is set open in the period T3a corresponding to the intake stroke and in the period T3d corresponding to the exhaust stroke. Moreover, the intake valve 203 is set close in the period T3b corresponding to the compression stroke and in the period T3c corresponding to the expansion stroke. The exhaust throttle valve 212 is set continuously close. Thus, it is possible to inhibit or prevent the unburned HC included in the residual gas from being emitted to the exterior of the engine 230, after the cranking operation.

As is clearly seen from the third embodiment, if such a construction is adopted that the exhaust throttle valve is closed in the initiation control, as occasion demands, as described above, it is also possible to control the operating condition of the internal combustion engine, provided with the variable valve operating mechanism capable of changing only the valve operating characteristics of the intake valve, out of the intake valve and the exhaust valve. In other words, in this case, it is possible to obtain the effect of the present invention, to a greater or lesser extent, even if the exhaust valve is not provided with the variable valve operating mechanism.

Fourth Embodiment

Next, the control apparatus in the fourth embodiment will be explained with reference to FIG. 18 to FIG. 22.

<<Entire Structure>>

Firstly, the entire structure of an engine provided with the control apparatus in the fourth embodiment will be explained with reference to FIG. 18 to FIG. 21. Incidentally, in FIG. 18 to FIG. 21, the same constituent elements as those in the first embodiment shown in FIG. 1 and FIG. 2 carry the same numerical references, and their explanation is omitted, as occasion demands.

FIG. 18 is a schematic diagram showing the structure of the engine provided with the control apparatus in the fourth embodiment.

In FIG. 18, an engine 240 is different from the engine 200 described above with reference to FIG. 1, in the point that there is provided: a water temperature sensor 2012; a target temperature setting device 130; a specific gravity sensor 2231; and a dielectric sensor 2232. An intake valve control device 114 sets the lift amount of the intake valve 203 to be a predetermined lift amount, on the basis of a deviation between the actual temperature of cooling water specified by the water temperature sensor 2012 and a target temperature set by the target temperature setting device 130. At this time, the target temperature is corrected in accordance with the outputs of the specific gravity sensor 2231 and the dielectric sensor 2232.

The water temperature sensor 2012 as one example of the "temperature specifying device" of the present invention, is disposed in the water jacket of a cylinder block which contains the cylinder 201. The water temperature sensor 2012 detects the temperature of the cooling water of the engine 240, and transmits it to the control apparatus 140 electrically connected thereto.

The target temperature setting device 130 as one example of the "target temperature setting device" of the present invention, sets the target temperature of the cooling water to be reached during the cranking operation, from the viewpoint of acceleration of fuel microparticulation. Specifically, the target temperature setting device 130 sets the target temperature on the basis of the temperature characteristics (e.g. evaporation temperature) of the fuel in a fuel tank 223.

The specific gravity sensor 2231 detects the content ratio of crude fuel in the fuel tank 223, to thereby quantitatively estimate a difficulty in evaporating the fuel.

The dielectric sensor 2232 detects the alcohol concentration of the fuel in the fuel tank 223, to thereby quantitatively estimate the difficulty in evaporating the fuel.

FIG. 19 is a characteristic diagram showing a relationship between the lift amount of the intake valve and an increased temperature and a pumping loss in the fourth embodiment.

FIG. 19 shows the relationship that as the lift amount of the intake valve 203 reduces more, the increased temperature ΔT of the cooling water relatively increases. Firstly, this relationship is caused by that the lift amount of the intake valve and the pumping loss have a negative correlation. This is because as the lift amount reduces more, an energy loss in passing through the intake valve 203 is considered to increase more. Secondly, this is because the pumping loss and the increased temperature of the cooling water have a positive correlation. This is because the energy loss due to the pumping loss is considered to increase the air temperature as heat. Then, FIG. 19 shows that a "maximum increased temperature corresponding to a maximum pumping loss" ΔTmax is 50 [° C./stroke], for example, and the lift amount which gives this is 1 [mm], for example. Namely, if the lift amount is set 1 [mm], the temperature of the cooling water is expected to increase by 50° C. per one stroke. If the valve open status of the intake valve 203 is controlled on the basis of the relationship between the lift amount and the increased temperature, a predetermined increase in temperature is expected in the intake/expansion stroke and the compression/exhaust stroke during the cranking operation. This aspect will be explained by using FIG. 20. FIG. 20 are schematic diagrams showing a flow of intake gas in the intake/expansion stroke and the compression/exhaust stroke, in the fourth embodiment.

In FIG. 20, during the cranking operation of the engine 240, the exhaust valve 204 is set continuously close, whereas the intake valve 203 is set continuously open, while the lift amount is maintained to the predetermined lift amount. Then, along with the vertical movement of a piston 2011, (a) the intake/expansion stroke and (b) the compression/exhaust stroke are alternately repeated several times. At this time, the air including unburned fuel flows back and forth between the cylinder 201 and the intake tube 206. Therefore, in passing through the intake valve 203 that the lift amount is maintained to the predetermined lift amount, the temperature increases by ΔT, which is the energy loss caused by the pumping loss. If the temperature increased in this manner reaches the target temperature, a control apparatus 104 ends the cranking operation. FIG. 21 is an explanatory diagram showing the valve operating characteristics of the intake valve and the exhaust valve in the fourth embodiment. As shown in FIG. 21, the control apparatus 104 controls the valve operating apparatus 10 to set the intake valve 203 and the exhaust valve 204 in the normal operating condition after the cranking operation is ended, in other words, after the ignition of the engine 240.

As described above, the above-mentioned cranking is performed before the valves are set in the normal operating condition, so that the temperature in the cylinder 201 increases appropriately, which accelerates the evaporation or microparticulation of the unburned fuel and the new fuel provided in the normal operating condition. Therefore, the unburned fuel is avoided even in the normal condition, so that it is possible to reduce the exhaust emissions of the unburned HC of the engine 240.

<<Operation Process>>

Next, the operation process of the control apparatus in the fourth embodiment will be explained with reference to FIG. 22, in addition to FIG. 3 and FIG. 18 to FIG. 21. FIG. 22 is a flowchart showing the operation process of the control apparatus in the fourth embodiment. Incidentally, in FIG. 22, the same operation processes as those of the first embodiment shown in FIG. 3 carry the same numerical references, and their explanation is omitted, as occasion demands.

In FIG. 3, firstly, if it is judged that the engine 240 is initiation-controlled (the step S11: YES) and if it is judged that the cranking operation is not ended (i.e. it is during the cranking operation) (the step S12: NO), the valve operating apparatus 10 is controlled to set the intake valve 203 continuously open by using the intake valve control device 114, and valve operating apparatus 10 is controlled to set the exhaust valve 204 continuously close by using the exhaust valve control device 120 (the step S13). This control (i.e. the step S13) will be discussed in detail by using a sub routine in FIG. 22.

In FIG. 22, firstly, by using the target temperature setting device 130, the target temperature of the cooling water is set, from the viewpoint of the evaporation/microparticulation of the fuel, typically in advance (step S131).

Then, by using the specific gravity sensor 2231 and the dielectric sensor 2232, the specific gravity and the dielectric constant of the fuel stored in the fuel tank 223 are measured, and the crude fuel content ratio and the alcohol concentration are specified, to thereby estimate the difficulty in evaporating the fuel (step S132).

Then, by using the target temperature setting device 130, the target temperature is corrected on the basis of the specific gravity and the dielectric constant of the fuel (step S133). Namely, it is corrected in order to bridge the gap between the difficulty in evaporating the fuel assumed when the target temperature is set in advance and the actual difficulty in evaporating the fuel. Typically, the less evaporable the fuel is, the higher the target temperature is corrected to be. However, if increasing the target temperature too much adversely influences the operation of another part, an upper limit may be set, as occasion demands.

If the target temperature of the cooling water is set as described above, then, the actual temperature is detected by the water temperature sensor 2012 (step S134).

On the basis of the extent of a temperature deviation between the target temperature and the actual temperature of the cooling water, the intake valve control device 114 sets the predetermined lift amount (step S135).

Here, if the above-mentioned temperature deviation is equal to or less than $\Delta$Tmin indicating an allowable error from the target temperature (the step S135: YES), i.e. if the actual temperature is already in the range that is allowed as the error of the target temperature, it is not particularly necessary to increase the temperature during the cranking operation. Thus, this sub routine is ended.

On the other hand, if the above-mentioned temperature deviation is greater than $\Delta$Tmin (the step S135: NO), i.e. if the actual temperature is not allowed as the error of the target temperature, then, it is judged whether or not the above-mentioned temperature deviation is equal to or less than $\Delta$Tmax (e.g. 50 [° C./stroke) (step S136). The $\Delta$Tmax herein indicates the maximum increased temperature corresponding to the maximum pumping loss per one stroke.

Here, if the above-mentioned temperature deviation is equal to or less than the maximum increased temperature $\Delta$Tmax (the step S136: YES), the target temperature can be achieved by performing one intake stroke, for example. Thus, on the basis of the characteristic diagram in FIG. 19, the predetermined lift amount of the intake valve 203 is set on the basis of the temperature deviation (i.e. the increased temperature) (step S1371). The predetermined lift amount is obtained, typically from a map, or from an expression of "predetermined lift amount=F (target temperature−actual temperature)". Here, the function of "predetermined lift amount=F (increased temperature $\Delta$T)" is a function expressing a one to one relationship between the target increased temperature $\Delta$T and the predetermined lift amount to increase the temperature by that much.

On the other hand, if the above-mentioned temperature deviation is greater than the maximum increased temperature $\Delta$Tmax (the step S136: NO), even if the lift amount of the intake valve 203 is maintained to the predetermined lift amount which gives the maximum increased temperature $\Delta$Tmax, the temperature is never beyond the target temperature. Therefore, the predetermined lift amount is set to the one which allows the maximum increased temperature $\Delta$Tmax (step S1372). The predetermined lift amount is obtained, typically from a map, or from an expression of "predetermined lift amount=F ($\Delta$Tmax)".

After that, the valve operating apparatus 10 is controlled to set the intake valve 203 continuously open while the lift amount is maintained to the above-mentioned predetermined lift amount, by using the intake valve control device 114. Simultaneously or in tandem with this, the valve operating apparatus 10 is controlled to set the exhaust valve 204 continuously close by using the exhaust valve control device 120 (step S138). Then, as it is, one stroke of the cranking is performed (step S139). For example, one intake stroke is performed. At this time, as shown in FIG. 19 to FIG. 21, the temperature of the cooling water increases by $\Delta$T by receiving the energy lost due to the pumping loss. Namely, the temperature of the air including the unburned fuel which flows back and forth between the cylinder 201 and the intake tube 206, increases relatively.

Typically, several strokes of the cranking operation are repeated until reaching the target temperature, and then, this sub routine is ended (the step S135: YES).

Then, back in FIG. 3, as the result of the sub routine, if it is judged that the cranking operation is ended (i.e. it is not during the cranking operation) (the step S12: YES), the intake valve 203 and the exhaust valve 204 are controlled by the control apparatus 104 to set in the normal operating condition (the step S14). Namely, as described above with reference to FIG. 21, in the period T2 which is after the cranking operation, the intake valve 203 and the exhaust valve 204 are set in the normal operating condition.

As is clearly seen from the fourth embodiment, if the intake valve 203 is set continuously open whereas the exhaust valve 204 or the like is set continuously close while the lift amount is maintained to the predetermined lift amount during the cranking operation, that accelerates the evaporation or microparticulation of the unburned fuel and the new fuel provided in the normal operating condition. Therefore, the unburned fuel is avoided even in the normal condition, so that it is possible to more greatly reduce the exhaust emissions of the unburned HC of the engine 240.

The present invention is not limited to the above-described embodiment, and various changes may be made, if desired, without departing from the essence or spirit of the invention which can be read from the claims and the entire specification. A control apparatus for controlling an internal combustion engine, which involves such changes, is also intended to be within the technical scope of the present invention.

INDUSTRIAL APPLICABILITY

The control apparatus for controlling an internal combustion engine of the present invention can be applied to the engine of an automobile or the like, for example.

The invention claimed is:

1. A control apparatus for an internal combustion engine, for controlling an operating condition of an internal combustion engine comprising a variable valve operating mechanism capable of changing valve operating characteristics of an intake valve and an exhaust valve, said control apparatus comprising:

an intake valve controlling device for controlling the variable valve operating mechanism to set the intake valve continuously open while a lift amount is maintained to a predetermined lift amount, during a cranking operation of the internal combustion engine;

an exhaust controlling device for controlling at least one of the variable valve operating mechanism and an exhaust throttle valve, to set at least one of the exhaust valve and the exhaust throttle valve continuously close, during the cranking operation, the exhaust throttle valve being disposed in an exhaust path on a downstream side of the exhaust valve;

a temperature specifying device for specifying an actual temperature of cooling water for cooling the internal combustion engine; and a target temperature setting device for setting a target temperature of the cooling water to be reached during the cranking operation, said intake valve controlling device setting the predetermined lift amount, on the basis of a deviation between the actual temperature and the target temperature.

2. A control apparatus for an internal combustion engine, for controlling an operating condition of an internal combustion engine comprising a variable valve operating mechanism capable of changing valve operating characteristics of an intake valve and an exhaust valve, said control apparatus comprising:

an intake valve controlling device for controlling the variable valve operating mechanism to set the intake valve open, during a cranking operation of the internal combustion engine;

and an exhaust controlling device for controlling at least one of the variable valve operating mechanism and an exhaust throttle valve, to set at least one of the exhaust valve and the exhaust throttle valve close, during the cranking operation, the exhaust throttle valve being disposed in an exhaust path on a downstream side of the exhaust valve, wherein:

said intake valve controlling device sets the intake valve open in an exhaust stroke, in a first period from after the cranking operation to a time that burned gas concentration of the internal combustion engine is equal to or greater than a predetermined value, and said exhaust controlling device sets at least one of the exhaust valve and the exhaust throttle valve close in the first period.

3. The control apparatus for an internal combustion engine according to claim 2, wherein said intake valve controlling device has a concentration estimating device for estimating the burned gas concentration.

4. The control apparatus for an internal combustion engine according to claim 3, wherein said concentration estimating device estimates the burned gas concentration on the basis of carbon dioxide concentration in an intake tube communicated with the intake valve.

5. The control apparatus for an internal combustion engine according to claim 3, wherein said intake valve controlling device sets the predetermined value variable, in accordance with one or a plurality of parameters for defining the operating condition.

6. The control apparatus for an internal combustion engine according to claim 1, wherein the internal combustion engine is divided into a plurality of cylinders, the variable valve operating mechanism has a valve operating apparatus for converting a rotational motion outputted from a valve driving source to a linear motion by using a motion converting device disposed in each of the plurality of cylinders and for open/close driving the intake valve and the exhaust valve of each of the plurality of cylinders by using the linear motion, and the valve operating apparatus comprises: an electric motor shared as the valve driving source by a cylinder group comprising a plurality of cylinders whose valve open periods are not overlapped; and a transfer mechanism for transferring rotation of the electric motor to a body of revolution of each motion converting device of the cylinder group.

7. The control apparatus for an internal combustion engine according to claim 2, wherein the internal combustion engine is divided into a plurality of cylinders, the variable valve operating mechanism has a valve operating apparatus for converting a rotational motion outputted from a valve driving source to a linear motion by using a motion converting device disposed in each of the plurality of cylinders and for open/close driving the intake valve and the exhaust valve of each of the plurality of cylinders by using the linear motion, and the valve operating apparatus comprises: an electric motor shared as the valve driving source by a cylinder group comprising a plurality of cylinders whose valve open periods are not overlapped; and a transfer mechanism for transferring rotation of the electric motor to a body of revolution of each motion converting device of the cylinder group.

8. The control apparatus for an internal combustion engine according to claim 2, wherein said intake valve controlling device controls the variable valve operating mechanism to set the intake valve continuously open while a lift amount is maintained to a predetermined lift amount, during the cranking operation.

9. The control apparatus for an internal combustion engine according to claim 8, further comprising:

a temperature specifying device for specifying an actual temperature of cooling water for cooling the internal combustion engine; and a target temperature setting device for setting a target temperature of the cooling water to be reached during the cranking operation, said intake valve controlling device setting the predetermined lift amount, on the basis of a deviation between the actual temperature and the target temperature.

10. The control apparatus for an internal combustion engine according to claim 1, wherein if the deviation is greater than a maximum increased temperature corresponding to a maximum pumping loss in the internal combustion engine, said intake valve controlling device sets a lift amount corresponding to the maximum pumping loss as the predetermined lift amount, instead of setting the predetermined lift amount on the basis of the deviation.

11. The control apparatus for an internal combustion engine according to claim 9, wherein if the deviation is greater than a maximum increased temperature corresponding to a maximum pumping loss in the internal combustion engine, said intake valve controlling device sets a lift amount corresponding to the maximum pumping loss as the predetermined lift amount, instead of setting the predetermined lift amount on the basis of the deviation.

12. The control apparatus for an internal combustion engine according to claim 1, wherein said target temperature setting device corrects the set target temperature, in accordance with a specific gravity of fuel which contributes combustion in the internal combustion engine.

13. The control apparatus for an internal combustion engine according to claim 9, wherein said target temperature setting device corrects the set target temperature, in accordance with a specific gravity of fuel which contributes combustion in the internal combustion engine.

14. The control apparatus for an internal combustion engine according to claim 1, wherein said target temperature setting device corrects the set target temperature, in accordance with a dielectric constant of fuel which contributes combustion in the internal combustion engine.

15. The control apparatus for an internal combustion engine according to claim 9, wherein said target temperature setting device corrects the set target temperature, in accordance with a dielectric constant of fuel which contributes combustion in the internal combustion engine.

* * * * *